United States Patent
Moussa et al.

(10) Patent No.: US 8,468,109 B2
(45) Date of Patent: Jun. 18, 2013

(54) ARCHITECTURE, SYSTEM AND METHOD FOR ARTIFICIAL NEURAL NETWORK IMPLEMENTATION

(76) Inventors: Medhat Moussa, Waterloo (CA); Antony Savich, Guelph (CA); Shawki Areibi, Waterloo (CA)

( * ) Notice: Subject to any disclaimer, the term of this patent is extended or adjusted under 35 U.S.C. 154(b) by 0 days.

(21) Appl. No.: 13/338,869

(22) Filed: Dec. 28, 2011

(65) Prior Publication Data
US 2012/0166374 A1 Jun. 28, 2012

Related U.S. Application Data

(63) Continuation of application No. 11/953,671, filed on Dec. 10, 2007, now Pat. No. 8,103,606.

(60) Provisional application No. 60/869,146, filed on Dec. 8, 2006.

(51) Int. Cl.
*G06F 15/18* (2006.01)
*G06N 3/00* (2006.01)
*G06N 3/063* (2006.01)

(52) U.S. Cl.
CPC .................................... *G06N 3/063* (2013.01)
USPC ........................................................... 706/31

(58) Field of Classification Search
USPC .................................................... 706/26–43
See application file for complete search history.

(56) References Cited

U.S. PATENT DOCUMENTS

| | | | |
|---|---|---|---|
| 5,083,285 A | 1/1992 | Shima et al. | |
| 5,146,543 A | 9/1992 | Vassiliadis et al. | |
| 5,148,515 A | 9/1992 | Vassiliadis et al. | |
| 5,220,641 A | 6/1993 | Shima et al. | |
| 5,243,688 A | 9/1993 | Pechanek et al. | |
| 5,327,522 A | 7/1994 | Furuta et al. | |
| 5,544,336 A | 8/1996 | Kato et al. | |
| 5,592,589 A | 1/1997 | Poon | |
| 5,717,832 A | 2/1998 | Steimle et al. | |
| 5,892,962 A | 4/1999 | Cloutier | |
| 6,237,029 B1 | 5/2001 | Master et al. | |
| 6,332,137 B1 | 12/2001 | Hori | |
| 6,601,049 B1 | 7/2003 | Cooper | |
| 6,654,730 B1 | 11/2003 | Kato et al. | |
| 6,834,239 B2 | 12/2004 | Lobanov et al. | |
| 6,999,952 B1 | 2/2006 | Pham | |

(Continued)

OTHER PUBLICATIONS

Valafar, Faramarz et al.; "A Parallel Implementation of Backpropagation Neural Network on MASPAR MP-1"; 1993; Purdue University; pp. 1-35.*

(Continued)

*Primary Examiner* — Jeffrey A Gaffin
*Assistant Examiner* — Stanley K Hill
(74) *Attorney, Agent, or Firm* — Borden Ladner Gervais LLP; Neil Henderson

(57) ABSTRACT

Systems and methods for a scalable artificial neural network, wherein the architecture includes: an input layer; at least one hidden layer; an output layer; and a parallelization subsystem configured to provide a variable degree of parallelization to the artificial neural network by providing scalability to neurons and layers. In a particular case, the systems and methods may include a back-propagation subsystem that is configured to scalably adjust weights in the artificial neural network in accordance with the variable degree of parallelization. Systems and methods are also provided for selecting an appropriate degree of parallelization based on factors such as hardware resources and performance requirements.

10 Claims, 20 Drawing Sheets

U.S. PATENT DOCUMENTS

| | | | |
|---|---|---|---|
| 7,082,419 | B1 | 7/2006 | Lightowler |
| 7,088,860 | B2 | 8/2006 | Matsugu et al. |
| 2006/0107153 | A1 | 5/2006 | Pham |
| 2007/0022063 | A1 | 1/2007 | Lightowler |

OTHER PUBLICATIONS

Eldredge, James G. et al.; "RRANN: A Hardware Implementation of the Backpropagation Algorithm Using Reconfigurable FPGAs"; 2007; 3rd Southern Conference on Programmable Logic; pp. 2097-2102.*

S. Tam, B. Gupta, H. Castro, and M. Holler, "Learning on an Analog VLSI Neural Network Chip", In Proceedings of the IEEE International Conference on Systems, Man and Cybernetics, 1990.

Faramarz Valafar and Okan K. Ersoy, A Parallel Implementation of Backpropagation Neural Network on Maspar MP-1, Electrical and Computer Engineering 1993, ECE Technical Reports, Mar. 1993, Indiana USA.

David Goldberg, "What Every Computer Scientist Should Know About Floating-Point Arithmetic", Technical Report, Sun Microsystems, 1994, California USA.

J. S. Yih and P. Mazumder, "A Neural Network Design for Circuit Partitioning", In DAC '89: Proceedings of the 26th ACM/IEEE conference on Design automation, pp. 406-411, ACM Press, NY, USA, 1989.

Jihan Zhu and George Milne, "Implementing Kak Neural Networks on a Reconfigurable Computing Platform", Proceedings of the roadmap to reconfigurable computing, 10th International workshop on field programming logic and application, pp. 260-269, 2000, London UK.

Jihan Zhu and Peter Sutton, "FPGA implementations of neural networks—s survey of a decade of progress", In International Conference on Field Programmable Logic and Applications, pp. 1062-1066, Lisbon, Portugal, Sep. 2003.

Jihan Zhu and Peter Sutton, "FPGA Implementations of Neural Networks—S Survey of a Decade of Progress", International Conference on Field Programmable Logic and Applications, pp. 1062-1066, Sep. 2003 Lisbon, Portugal.

J. Zhu, G.J. Milne, and B.K. Gunther, "Towards an FPGA Based Reconfigurable Computing Environment for Neural Network Implementation", IEEE Conference 1999, ICP 470 vol. 2, pp. 661-666, Sep. 1999, Edinburgh UK.

European Patent Office, Supplementary European Search Report dated Apr. 4, 2012, European Patent Appln No. 07 85 5509, The Hague Netherlands.

Eldredge et al; Density Enhancement of a Neural Network Using FPGAs and Run-Time Reconfiguration: FPGAs for Custom Computing Machines, Apr. 10, 1994 Proceedings IEEE Workshop Napa Valley CA USA p. 180-188.

International Searching Authority, International Search Report, Apr. 8, 2008, PCT/CA2007/002227.

International Searching Authority, The Written Opinion of the International Searching Authority, Apr. 8, 2008, PCT/CA2007/002227.

Antony Savich, Medhat Moussa and Shawki Areibi, "Scalable Pipelined Architecture for Real-time Computation of MLP-BP", Microprocessors and Microsystems (Special Issue), Jan. 2011.

Rafael Gadea Girones, Ricardo Colom Palero, Joaquin Cerda Boluda and Angel Sebastia Cortes,."FPGA Implementation of a Pipelined On-Line Backpropagation", Journal of VLSI Signal Processing v40, Issue 2, pp. 189-213, Jun. 2005.

S. Abid, F. Fnaiech and M. Najim, "A Fast Feedforward Training Algorithm Using a Modified Form of the Standard Backpropagation Algorithm", IEEE Transactions on Neural Networks, vol. 12, No. 2, pp. 424-430, Mar. 2001.

D. Anguita, A. Boni, and S. Ridella, "A Digital Architecture for Support Vector Machines: Theory, Algorithm, and FPGA Implementation," IEEE Transactions on Neural Networks, vol. 14, No. 5, pp. 993-1009, Sep. 2003.

J. Ayala, A. Lomena, M. Lopez-Vallejo, and A. Fernandez, "Design of a Pipelined Hardware Architecture for Real-Time Neural Network Computations", In 45th Midwest Symposium on Circuits and Systems, pp. 419-422, Aug. 2002, Madrid Spain.

Magdy A. Bayoumi, Q.M. Malluhi, and T.R.N. Rao, "Efficient Mapping of ANNs on Hypercube Massively Parallel Machines", IEEE Transactions on Computers, IEEE Computer Society, vol. 44, No. 6, pp. 769-779, Jun. 1995.

Pavle Belanovic, Library of Parameterized Hardware Modules for Floating-Point Arithmetic with an Example Application, M.A.Sc Thesis, ECE Department, Northeastern University, May 2002, Massachusetts USA.

R. P. Brent, "Fast Training Algorithms for Multilayer Neural Nets," IEEE Transactions on Neural Networks, vol. 2, No. 3, pp. 202-210, May 1991.

Chun-Hsien Chen and V. Honavar, "A Neural-Network Architecture for Syntax Analysis", IEEE Transactions on Neural Networks, vol. 10, No. 1, pp. 94-114, Jan. 1999.

Stephen Coe, "A memetic algorithm implementation on a FPGA for VLSI circuit partitioning" Master's thesis, School of Engineering, University of Guelph, 2004.

Hugo De Garis and Michael Korkin, "The CAM-Brain Machine (CBM) an FPGA Based Hardware Tool That Evolves a 1000 Neuron-Net Circuit Module in Seconds and Updates a 75 Million Neuron Artificial Brain for Real-Time Robot Control", Neurocomputing journal, vol. 42, pp. 35-68, 2002.

M. Duranton, "Image Processing by Neural Networks", Micro, IEEE, vol. 16, No. 5, pp. 12-19, Oct. 1996.

D. Erdogmus, O. Fontenla-Romero, J.C. Principe, A. Alonso-Betanzos, and Castillo E., "Linear-Least-Squares Initialization of Multilayer Perceptrons Through Backpropagation of the Desired Response", IEEE Transaction on Neural Networks, vol. 16, No. 2, pp. 325-337, Mar. 2005.

G. Even and P.Wolfgang, "On the Design of IEEE Compliant Floating Point Units", IEEE Transactions on Computers, vol. 49, No. 5, pp. 398-413, May 2000.

Chun Te Ewe, "Dual Fixed-Point: An Efficient Alternative to Floating-Point Computation for DSP Applications", In Field Programmable Logic and Application, pp. 715-716, Tampere, Finland, Aug. 2005.

Chun Te Ewe, Peter Y.K. Cheung, and George A. Constantinides, "Error Modelling of Dual Fixed-Point Arithmetic and Its Application in Field Programmable Logic", In Field Programmable Logic and Application, pp. 124-129, Tampere, Finland, Aug. 2005.

Rafael Gadea, Joaquin Cerda, Franciso Ballester, and Antonio Mocholi, "Artificial Neural Network Implementation on a Single FPGA of a Pipelined On-Line Backpropagation", IEEE, pp. 225-230, 2000.

Rafael Gadea Girones and Antonio Mocholi Salcedo, "Implementation With FPGAs of a Pipelined On-Line Backpropagation", Electronics, Circuits and Systems, Proceedings of ICECS '99. The 6th IEEE International Conference, vol. 2, pp. 1021-1024, 1999.

G. Govindu, L. Zhuo, S. Choi, and V. Prasanna, "Analysis of High-Performance Floating-Point Arithmetic on FPGAs", In IEEE International Parallel and Distributed Processing Symposium, pp. 149-156, Santa Fe, New Mexico, Apr. 2004.

G. Heidemann and H. Ritter, "Combining Multiple Neural Nets for Visual Feature Selection and Classification", ICANN99, vol. 1, pp. 365-370, Bielefeld Germany, Dec. 1999.

Hiroomi Hikana, "Frequency-Based Multilayer Neural Network With On-Chip Learning and Enhanced Neuron Characteristics", IEEE Transactions on Neural Networks, vol. 10, No. 3, pp. 545-553, May 1999.

J.L. Holt and T.E. Baker, "Backpropagation Simulations Using Limited Precision Calculations", International Joint Conference on Neural Networks (IJCNN-91), pp. 121-126, Seattle, Washington, Jul. 1991.

Ray-I Change Pei-Yung Hsiao, "VLSI Circuit Placement With Rectilinear Modules Using Three-Layer Force-Directed Self-Organizing Maps", IEEE Transactions on Neural Networks, vol. 8, No. 5, pp. 1049-1064, Sep. 1997.

Guang-Bin Huang, Qin-Yu Zhu, and Chee-Kheong Siew, "Real-Time Learning Capability of Neural Networks", IEEE Transactions on Neural Networks,, vol. 17, No. 4, pp. 863-878, Jul. 2006.

S. Hunt, C. Egan, and A. Shafarenko, "A Simple Yet Accurate Neural Branch Predictor", Int'l Conf. on Artificial Intelligence and Application, Malaga, Spain, 2003.

M. Lynch, H. Patel, A. Abrahamse, A. Rupa Rajendran, and L. Medsker, "Neural Network Application in Physics", Proceedings of International Joint Conference on Neural Networks, pp. 2054-2058, Jul. 2001.

Roth U. Jahnke A. and Klar H., "A SIMD/Dataflow Architecture for a Neurocomputer for Spike-Processing Neural Networks (NESPINN)", pp. 232-237, 1996.

Robert Jacobs, Michael Jordan, Steven Nowlan, and Geoffrey Hinton, "Adaptive Mixtures of Local Experts", Neural Computation, vol. 3, pp. 79-87, 1991.

J.O. Haenni, J.L. Beuchat and E. Sanchez, "Hardware Reconfigurable Neural Networks", In 5th Reconfigurable Architectures Workshop (RAW '98), pp. 91-98, Orlando, Florida, USA, 1998.

John Jingfu Jenq and Wingning Li, "Feedforward Backpropagation Artificial Neural Networks on Reconfigurable Meshes", Future Generation Computer Systems, Elseview Science Publishers B.V., vol. 14, No. 5-6, pp. 313-319, 1998.

Michael Jordan and Robert Jacobs, "Hierarchial Mixtures of Experts and the EM Algorithm", Proceedings of 1993 International Joint Conference on Neural Networks, vol. 6, pp. 181-214, 1994.

George N. Karystinos and Dimitris A. Pados, "On Overfitting, Generalization and Randomly Expanded Training Sets", IEEE Transactions on Neural Networks, vol. 11, No. 5, pp. 1050-1057, Sep. 2000.

D. Katic and M. Vukobratovic, "Intelligent Control of Humanoid Robots Using Neural Networks", In 7th Seminar on Neural Network Applications in Electrical Engineering, pp. 31-35, Sep. 2004, Serbia.

N. Kojic, I. Reljin, and B. Reljin, "Neural Network for Finding Optimal Path in Packet-Switched Network", In 7th Seminar on Neural Network Applications in Electrical Engineering, pp. 91-96, Sep. 2004, Serbia and Montenegro.

Xiaoguang Li, "A Hardware/Software Co-Design Approach for Face Recognition" Master's thesis, School of Engineering, University of Guelph, 2004, Ontario Canada.

X. Li, M. Moussa, and S. Areibi, "Arithmetic Formats for Implementing Artificial Neural Networks on FPGAs", Canadian Journal on Electrical and Computer Engineering, vol. 31, No. 1, pp. 31-40, Jan. 2006.

W.B. Ligon III, S. McMillan, G. Monn, K. Schoonover, F. Stivers, and K.D. Underwood, "A Re-Evaluation of the Practicality of Floating Point Operations on FPGAs", In Kenneth L. Pocek and Jeffrey Arnold, editors, IEEE Symposium on FPGAs for Custom Computing Machines, pp. 206-215, IEEE Computer Society Press, Los Alamitos, CA, 1998.

P. Lysaght, J. Stockwood, J. Law, and D. Girma, "Artificial Neural Network Implementation on a Fine-Grained FPGA", In R. Hartenstein and M.Z. Servit, editors, Field-Programmable Logic: Architectures, Synthesis and Applications. 4th International Workshop on Field-Programmable Logic and Applications, pp. 421-431, Springer-Verlag, Prague, Czech Republic, 1994.

Y. Maeda and M. Wakamura, "Simultaneous Perturbation Learning Rule for Recurrent Neural Networks and Its FPGA Implementation", IEEE Transactions on Neural Networks vol. 16, No. 6, pp. 1664-1672, Nov. 2005.

K. Mathia and J. Clark, "On Neural Network Hardware and Programming Paradigms", In Neural Networks, 2002. IJCNN '02. Proceedings of the 2002 International Joint Conference on, pp. 2692-2697, Honolulu, HI, May 2002.

M. Moussa, S. Areibi, and K. Nichols, "On the Arithmetic Precision for Implementing Back-Propagation Networks on PFGAs; A Case Study", In Book Chapter on FPGA Implementation of Neural Networks, pp. 2004, Ontario Canada.

M. A. Moussa, "Combining Expert Neural Networks Using Reinforcement Feedback for Learning Primitive Grasping Behaviour", IEEE Transactions on Neural Networks, vol. 15, No. 3, pp. 629-638, May 2004.

H. S. Ng and K. P. Lam, "Analog and Digital FPGA Implementation of BRIN for Optimization Problems", IEEE Transactions on Neural Networks, vol. 14, No. 5, pp. 1413-1425, Sep. 2003.

A. Petrowski, G. Dreyfus, and C. Girault, "Performance Analysis of a Pipelined Backpropagation Parallel Algorithm", IEEE Transactions on Neural Networks,, vol. 4, No. 6, pp. 970-981, Nov. 1993.

Mario Porrmann, Ulf Witkowski, Heiko Kalte, and Ulrich Ruckert, "Implementation of Artificial Neural Networks on a Reconfigurable Hardware Accelerator", Proceedings of the 10th Euromicro Workshop on Parallel, Distributed and Network-based Processing (EUROMICRO-PDP'02).

A. Savich, M. Moussa, and S. Areibi, "The Impact of Arithmetic Representation on Implementing MLP-BP on FPGAs: A Study," IEEE Transactions on Neural Networks, vol. 18, No. 1, Jan. 2007.

A. Sperduti and A. Starita, "Speed Up Learning and Network Optimization With Extended Back Propagation", Neural Networks, vol. 6, pp. 365-383, 1993.

European Patent Office, Examination Report on EP Appln No. 07855509.1, dated Dec. 10, 2012.

* cited by examiner

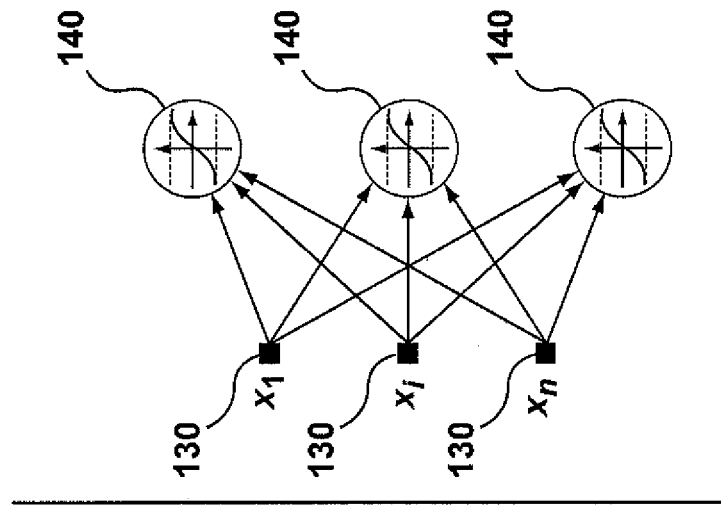
Fig. 2(c)
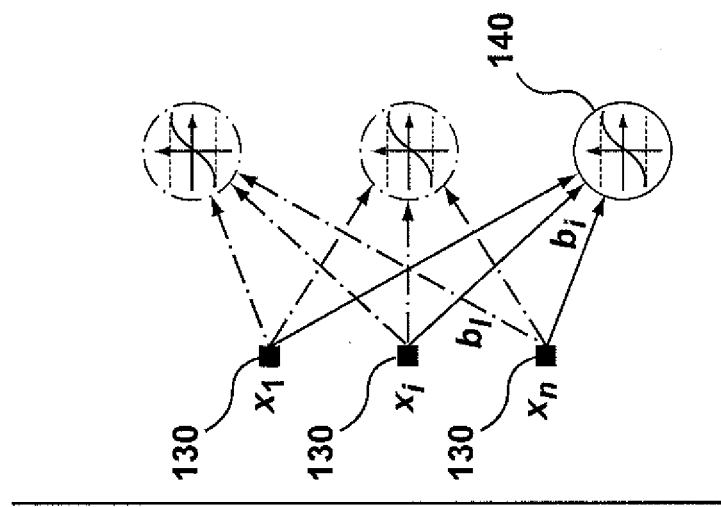
Fig. 2(b)
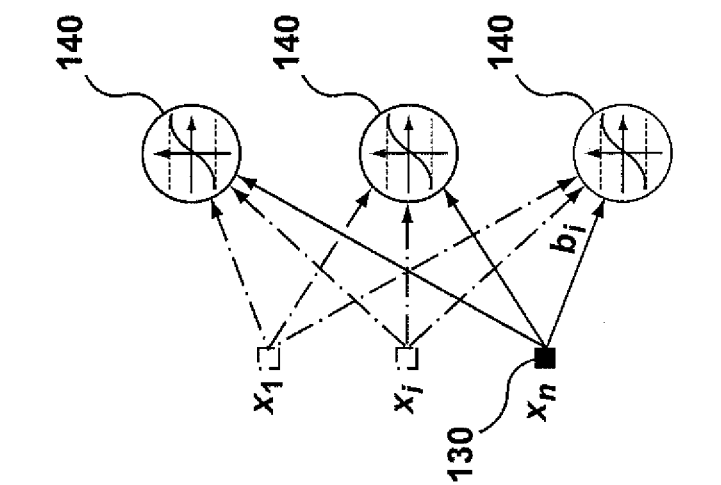
Fig. 2(a)
Fig. 2

ARCHITECTURE, SYSTEM AND METHOD FOR ARTIFICIAL NEURAL NETWORK IMPLEMENTATION

PRIORITY CLAIM

This application is a continuation of U.S. patent application Ser. No. 11/953,671, filed Dec. 10, 2007, which claims the priority of U.S. Provisional Application No. 60/869,146 filed on Dec. 8, 2006, the entire content of each of which is hereby incorporated by reference.

TECHNICAL FIELD

This application relates to an architecture, systems and methods for implementing artificial neural networks, and in particular, to implementing a scalable artificial neural network using multi-layer perceptrons and error back-propagation on configurable hardware devices.

BACKGROUND

Artificial Neural Networks are devices intended to simulate or mimic the behaviour of the network of neurons that exist in the human brain. Artificial neural networks generally consist of one or more layers containing neurons. The neural network is trained by presenting known data at an input and then testing the actual output against the desired output (training data) and adjusting the neural network accordingly. While having a number of potential applications, the growth of neural network technology has been hampered by issues involving the number of neurons needed to make a functional neural network, the training data/time required and the performance of the neural network when implemented in software or hardware.

One common Artificial Neural Network (ANNs) format consists of multi-layer perceptrons trained using the error back-propagation algorithm (MLP-BP). An MLP-BP network can be used in a wide variety of applications. However, to date, an MLP-BP network has typically only been implemented in software systems or in statically designed hardware systems.

A major issue in using an MLP-BP network is the difficulty of determining a clear methodology in setting up the initial topology and parameters. Topology has a significant impact on the network's computational ability to learn the target function and to generalize from training patterns to new patterns.

If a network has too few free parameters (for example, weights), training could fail to achieve the required error threshold. On the other hand, if the network has too many free parameters, then a large data set is needed to provide adequate training. In this case, the possibility of over-fit is higher, which jeopardizes generalization as well. Generalization is the ability for a network to predict the outcome (network output) for previously unseen input patterns or vectors. Overfit occurs during training when input patterns of a limited dataset are presented too many times, and the network has more free parameters than needed. This results in a network that is capable of recognizing previously seen patterns very well, but fails to produce a good generalization to predict outcomes for some or all of the remainder of possible different input patterns.

It is typically not possible to experiment with a large number of topologies to determine various effects of the changes on network performance because of the long training sessions required. As a result, heuristics have typically been used to speed the training process while preventing over-fitting. Yet even with the use of heuristics, this training process is generally limited to off-line learning, to applications where training data is static, or where conditions initially determined will stay the same for the duration of network's useful function.

However, when on-line learning is necessary or when the solution space is dynamic and new data is being added continuously, there exists a need for testing a wide range of topologies in real-time. For example, real-time data mining of customers' databases that are continuously updated is a growing area with significant commercial interest. Moreover, since ANNs are inherently parallel architectures, there have been some efforts to explore real-time parallel computing architecture implementations.

Conventional ANN implementations range from software-based implementations on general-purpose computers to specialized hardware dedicated to ANN simulations (neurocomputers). Other efforts include designing and building parallel systems based on transputers, digital signal processors (DSPs), or Application Specific Integrated Circuits (ASICs) that include multiple parallel processing units and act like ANN accelerators.

However, software designs tend to be slower in operation and conventional hardware designs require using special hardware boards or ASIC chips, which limit their use on a large scale. In addition, the resource utilization is static and implementations cannot adapt to differing amounts of available hardware resources. The resulting networks are constrained by size and type of algorithm implemented.

More recently, the focus on ANN hardware implementation has shifted toward reconfigurable platforms, and particularly Field Programmable Gate Arrays (FPGAs). One past effort used a Runtime Reconfiguration (RTR) to improve the hardware density of FPGAs by dividing the BP algorithm into three, sequentially executed stages. The FPGA was configured to execute only one stage at a time. However, the enhanced processing density was at the expense of significant deterioration in performance.

Another past effort involved using a systolic array to implement a MLP network with a pipelined modification of the on-line back propagation algorithm. However, the modification itself requires circumventing some temporal properties of the algorithm creating a marginal degradation in training convergence. Moreover, the resource utilization of this design is static, increasing with the increase of ANN size and topology regardless of the available resources on the hardware device. The resources required for implementing large-scale networks may make this design impractical for current configurable hardware device (e.g. FPGA) sizes.

As such there is a need for improved architectures, systems and methods of implementing ANNs, for example on configurable hardware devices, that overcome at least some of the problems with conventional systems and methods.

SUMMARY

According to one aspect, there is provided an architecture for a scalable artificial neural network, wherein the architecture includes: an input layer; at least one hidden layer; an output layer; and a parallelization subsystem configured to provide a variable degree of parallelization to the input layer, at least one hidden layer, and output layer. The provision of a parallelization subsystem allows for the use of a less parallel configuration if necessary to, for example, match with hardware resources available or to provide adequate performance without increasing hardware resource (and therefore cost) requirements.

In a particular case, the parallelization subsystem includes: for each layer, a synchronization module, wherein the synchronization module is configured to: receive an output from the layer; synchronize the output from the layer based on the variable degree of parallelization; and provide the output from the layer to the next layer in the network.

In another particular case, the architecture further includes a back-propagation subsystem configured to send error data back through the network to adjust weights associated with the output layer and the at least one hidden layer and wherein the parallelization subsystem is further configured to provide a variable degree of parallelization to the back-propagation subsystem.

In this case, the back-propagation subsystem may include: for each layer, a back-propagation module, the back-propagation module configured to; receive an error difference and error gradient from a next layer; and adjust the weights associated with the layer based on the error difference and error gradient. Still further, the architecture may further include one or more neurons in each hidden layer and output layer, wherein each neuron includes: a weight memory for storing weights associated with the neuron; a weighted sum module configured to receive the synchronized input and generate a weighted input sum; a transfer function module configured to receive the weighted input sum from the weighted sum module and generate output for the neuron; a weight change module configured to receive the local gradients and determine changes for the weights associated with the neuron; and a weight update module configured to update the weights stored in the weight memory using the determined weight changes. In a variation of this further case, the architecture may also include a pipeline subsystem to pipeline the scalable artificial neural network, the weight change module determines changes for the weights associated with the neuron using a latency delay, and the weight update module updates the weights in tune with the variable degree of parallelization. In another variation of this case, each neuron further comprises a pipeline buffer in tune with a latency delay.

In another particular case, the architecture may further include a pipeline subsystem to pipeline the scalable artificial neural network.

In yet another particular case, the architecture may further include a variable arithmetic representation for the scalable artificial neural network.

It will be understood that the architecture and embodiments thereof described herein represents a structure that may be embodied in software, hardware, a system or the like that allows for the input of parameters such as a desired network topology and hardware resources available and may provide for the output of a specific hardware configuration that implements or includes each of the elements of the architecture scaled to a particular application. The hardware configuration itself may be embodied in software or in hardware. In any case where an architecture or hardware configuration or the like is embodied in software, the software may be provided as computer readable code on a physical computer readable media that may be executed by a computing device.

According to another aspect, there is provided a method for designing or implementing a hardware configuration of an artificial neural network. The method includes: receiving information relating to hardware resources available for at least one hardware device; receiving a desired network topology; determining a plurality of degrees of parallelism for the desired network topology; for each degree of parallelism estimating at least one of: a hardware resource estimate to implement the network topology with the degree of parallelism; and a performance estimate for the network topology with the degree of parallelism; selecting a degree of parallelism based on the hardware resources available and at least one of the hardware resource estimates and the performance estimates; and generating a hardware configuration based on the degree of parallelism. This method allows the selection of a degree of parallelism for the architecture above based on a number of factors such that the most appropriate degree of parallelization for a particular application can be selected.

In a particular case, the estimating the hardware resource estimate may include: determining a number of weights based on the network topology; determining a measure of the hardware resources required to provide the determined number of weights based on the degree of parallelism; and assigning the determined measure of the hardware resources required as the hardware resource estimate.

In another particular case, the estimating a performance estimate may include: determining a number of weights based on the network topology; determining a measure of the hardware processing speed available; determining a number of updates that can be performed on the number of weights in a predetermined time based on the processing speed and the degree of parallelism; and assigning the determined number of updates as the performance estimate.

In yet another particular case, the selecting a degree of parallelism based on the hardware resources available and at least one of the hardware resource estimates and the performance estimates may include: determining the maximum hardware resources available from among the hardware resources available; determining a hardware resource estimate from among the hardware resource estimates that is closest to but less than or equal to the maximum hardware resources available; and determining the degree of parallelism associated with the determined hardware estimate.

In this case, the determining a hardware resource estimate from among the hardware resource estimates that is closest to but less than or equal to the maximum hardware resources available may further include determining the hardware resource estimate from among the hardware resource estimates that maximizes performance.

In yet another particular case, the method may further include receiving information related to an application performance requirement and the selecting a degree of parallelism based on the hardware resources available and at least one of the hardware resource estimates and the performance estimates may include: determining a performance estimate from among the performance estimates that is equal to or greater than the application performance requirement; and determining the degree of parallelism associated with the determined performance estimate.

In yet another particular case, the method may further include receiving an arithmetic representation and the estimating at least one of a hardware resource estimate and a performance estimate may be based on the received arithmetic representation.

In still yet another particular case, the generating a hardware configuration based on the degree of parallelism may include generating a hardware configuration that includes: an input layer; at least one hidden layer; an output layer; a back-propagation subsystem configured to send error data back through the network to adjust weights associated with the output layer and the at least one hidden layer; and a parallelization system configured to provide the determined degree of parallelization to each of the input layer, at least one hidden layer, output layer and back-propagation system.

In this case, the method may further include configuring a hardware device based on the hardware configuration.

According to yet another aspect, there is provided a method for training a scalable artificial neural network involving multi-layer perceptrons and error back propagation. The method including: feed-forwarding an input vector through the scalable network; wherein the input vector is subject to synchronization to provide a synchronized output vector; and back-propagating an error gradient vector through the scalable network, wherein the error gradient vector is calculated using the synchronized output vector and a target vector, which has been subject to synchronization, such that the error gradient vector is provided in a synchronized format based on the degree of parallelization.

According to yet another aspect, there is provided a method for operating a scalable artificial neural network involving multi-layer perceptrons including feed-forwarding an input vector through the scalable network; wherein the input vector is subject to synchronization within the scalable network to provide a synchronized output vector.

According to still yet another aspect, there is provided a system including: an input port for receiving an input vector; a scalable artificial neural network, wherein the input vector is fed forward through the scalable artificial neural network to provide an output vector and wherein the input vector is subject to synchronization within the scalable artificial neural network based on a predetermined degree of parallelization; and an output port for outputting the output vector.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment and in which:

FIGS. 2(a), 2(b), and 2(c) illustrate examples of three types of hardware parallelism for artificial neural network computations, and in particular FIG. 2(a) illustrates an example of node parallelism, FIG. 2(b) illustrates an example of synapse parallelism, and FIG. 2(c) illustrates an example of node and synapse parallelism;

DETAILED DESCRIPTION

Figure 1:
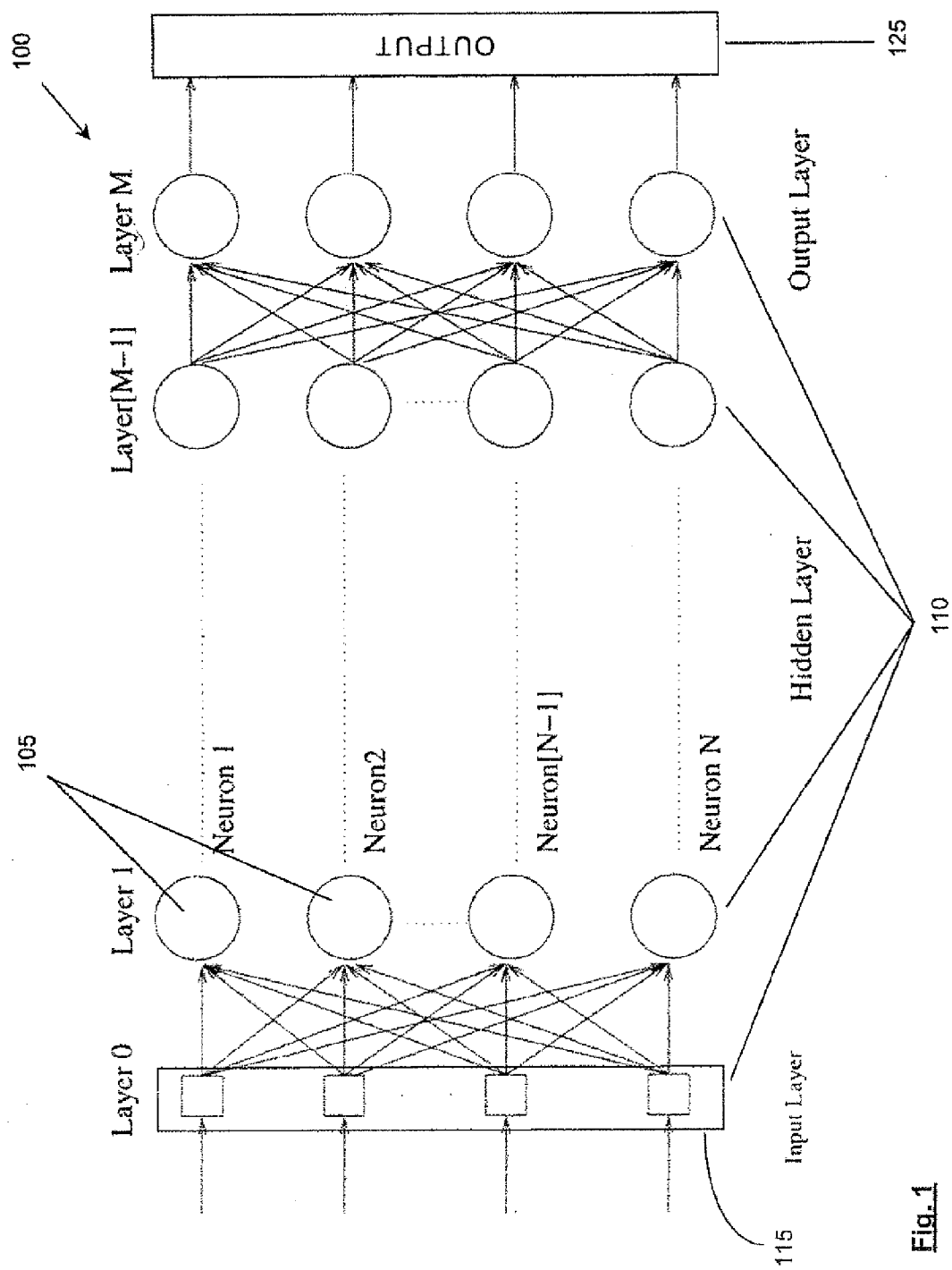
FIG. 1 illustrates an example diagram of a Multi-Layer Perceptron network containing neurons structured in a plurality of parallel layers.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that some embodiments may be practiced without these specific details. In other instances, well-known methods, procedures and components have not been described in detail so as not to obscure the embodiments described herein. Further, the description is not to be considered as limiting the scope of the application and the claims herein.

Generally speaking, embodiments described herein relate to architectures, systems and methods for configuring and implementing scalable ANNs. The architecture, systems and methods are intended to provide a customized scalable network with a variable degree of parallelism. The variable degree of parallelism is selected by estimating network performance and/or hardware resource utilization required for the scalable network, particularly when given the hardware resource capacity available for use in implementing the scalable network.

The embodiments may enable feed forward computation of an input pattern through the customized network in order to provide network output. The embodiments may also propagate an error gradient determined using the network output and a target through the scalable network.

In another aspect, the systems and methods described herein pipeline the customized scalable network to allow overlap processing of multiple patterns at the same time.

In a further aspect, the systems and methods described herein allow the customized scalable network to use a variable arithmetic representation for efficiency.

It will be understood that the methods described herein may be realized by a hardware description language, which may be stored on a configurable hardware-readable medium for execution by at least one hardware device Examples of possible hardware devices include FPGAs, programmable logic controllers (PLCs), programmable logic devices (PLDs), very-large-scale integration (VLSI) devices, computer processors, or ASICs. For ease of explanation, the embodiments described herein will generally relate to implementations using configurable hardware such as FPGAs. In the discussion that follows, it will be understood that hardware resources for the scalable network implementation may be provided by any of the above hardware devices, or, in at least some cases, by a combination thereof.

Using configurable hardware devices to implement ANNs, and more particularly MLP-BP networks, generally allows for more flexibility of network size, type, topology, and other constraints while maintaining increased processing density by taking advantage of the natural parallel structure of ANNs.

However, a number of design issues arise when using configurable hardware devices to implement ANNs, and specifically MLP-BP. The first is determining the most efficient arithmetic representation format while maintaining adequate precision to achieve learning. Another issue is the architecture, and particularly the means of efficiently implementing large networks when available hardware device resources are limited.

In general, the efficiency of an MLP-BP implementation on configurable hardware devices can be evaluated:

1) Performance: in terms of, for example, number of connection updates processed per second (CUPS) and in terms of convergence speed.

2) Resource utilization: in terms of hardware resources used and its proportion to the total hardware resources available.

Each implementation generally requires a tradeoff between these two factors. High performance typically requires a high degree of parallelism, which may require significant resources. A serial implementation requires fewer resources but severely impacts performance (for example, can result in a higher error threshold).

The nature of the application (problem) and the size of the network topology also play an important role. For example, pattern classification problems can allow a higher error threshold than function approximation problems. This impacts the choice of the arithmetic representation and, as such, the hardware device resources used in the implementation. Large resource consumption impacts the overall size of the network topology that can be implemented in parallel and overall performance.

An efficient scalable network implementation should generally maintain reasonable convergence speed and accuracy for a wide range of applications, achieve a high performance rate, and fit a reasonably large network within existing available hardware device resources. As such, there exists a need to develop architectures, systems and methods for implementing ANNs that have built-in mechanisms for balancing between performance and resource requirements in a consistent manner for a wide range of network topologies and varying amounts of hardware device resource availability.

Embodiments described herein relate to architectures, systems and methods for scalable ANN implementations that can be used on hardware devices and are intended to provide a balance between resource utilization and network performance. Scalability is implemented using a variable degree of parallelism. A scalable ANN may be implemented in a fully parallel design (including synapse and node parallelism) to maximize performance when the resources available on the hardware device allow that. When available resources are limited, the scalable ANN implementation may use a reduced degree of parallelism up to the point needed to fit the available resources while also achieving best performance. This allows the network performance and resource utilization to scale up or down well for large as well as small networks.

This feature may make it easier to fit an ANN on embedded applications where the hardware device may have limited resources because of physical size constraints or where the hardware device might be used for more than just running the ANN. For example, adaptive filters and encoders used in cell phones and other communication devices may have available hardware resources for an ANN implementation. Further example hardware devices include intelligent embedded sensors used in automotive and aerospace applications. The hardware device may also be used as a personal device such as a hearing device, a personal digital assistant, an iPod™, a videogame console, and a Blackberry™.

The scalability may also be augmented by incorporating two additional features to maximize performance and resource utilization regardless of the size of the network. First, to maximize performance, the architecture may also implement a pipelined design that uses an out of order weight update rule to overcome data hazards. Second, to minimize resource utilization, the most efficient arithmetic representation may be selected which balances between precision and area. Details on selecting an efficient arithmetic representation are described by the inventors of the present application in: A. Savich, M. Moussa, and S. Areibi, "The impact of arithmetic representation on implementing MLP-BP on FPGAs: a study," IEEE Transactions on Neural Networks, vol. 18, no 1, pp. 240-252, January 2007, the content of which is hereby incorporated by reference. Generally this study relates to the impact of 25 fixed and floating point arithmetic representations on convergence speed, generalization after training, and impact on FPGA resource utilization using several FPGA chips. These results allow for the prediction of the impact of a specific arithmetic representation on both convergence speed and FPGA configurable resources, such as for example slices, multipliers, configurable routing and memory used. In the case of an ASIC, the resources may, for example, comprise the amount of silicon area used.

In order to determine which degree of parallelism to implement for the scalable network, example formulas are provided herein that estimate network performance and/or hardware resource utilization. This allows for custom implementation of a network to maximize performance and minimize resource utilization given individual implementation-specific requirements, such as the desired network topology, the hardware device(s) and the hardware device(s) resources available to use for the implementation In order to more clearly illustrate the architecture, systems and methods of the present application, an exemplary ANN network architecture implementation will be described in detail. The example network will be a MLP-BP ANN configured for and implemented on a hardware device, such as a field programmable gate array.

Error Back Propagation and Training Details

A. The Error Back-Propagation Algorithm

Referring now to FIG. 1 there is shown an example diagram of a MLP-BP network 100 containing neurons 105 numbered 1 to N structured in a plurality of parallel layers 110 numbered 0 to M. The layers 110 include an input layer 110 (layer 0), hidden layer(s) 110 (layer(s) 1 to M−1), and an output layer 110 (layer M).

When implementing the BP algorithm, each neuron 105 contains two key arithmetic functions that perform forward and backward computations. The feed forward computation step uses internal weights (not shown) associated with each neuron 105 for calculating the neuron's 105 output. The error BP computation step compares the network's 100 overall output 125 to a target (not shown), computes an error gradient, and propagates the error through layers 110 by adjusting the neuron 105 weights to correct for it.

In general, an MLP-BP network 100 can be composed of any number of layers 110 as shown in FIG. 1. However, for simplicity only one hidden layer 110 and one output layer 110 will be used to explain the example embodiments. Note that the input layer 110 does not typically contain neurons 105 and instead comprises the input pattern(s) 115 used to train the network 100, and as such the input layer 110 (layer 0) functions somewhat differently than layers 1 to M. The output layer 110, or the last layer M in the network 100, provides the network output 125. As explained above, the network output 125 is compared to a target during the BP stage in order to compute the error gradient.

The 2 steps of the MLP-BP algorithm are as follows:

1) Feed Forward Computation: The computation performed by each neuron 105 in layer s during the feed forward computation stage is as follows:

$$o_k^{(s)} = f(H_k^{(s)}) = f\left(\sum_{j=1}^{N^{(s-1)}} w_{kj}^{(s)} o_j^{(s-1)} + w_{ko}^{(s)}\right) \quad (1)$$

where network layers 110 are s=1, M, and for each $k^{th}$ neuron in the $s^{th}$ layer:
M=total number of layers
$N^{(s-1)}$=number of neurons in layers (s−1)
$o_k^{(s)}$=output of the current neuron
f=activation function, computed on $H_k^{(s)}$
$H_k^{(s)}$=weighted input sum
$o_j^{(s-1)}$=output of the $j^{th}$ neuron in the $(s-1)^{th}$ layer
$w_{kj}^{(s)}$=synaptic weight contained in the current neuron k, associated with output of neuron j of layer (s−1)
$w_{ko}^{(s)}$=current neuron's bias weight.

For MLP-BP networks, a typical activation (or transfer) function is the log-sigmoid function given by the following equation, as well as the equation of its derivative:

$$f(x) = \frac{1}{1 - e^{-x}} \quad (2)$$
$$f'(x) = f(x) * (1 - f(x))$$

As will be explained further herein, an approximation of the above Equation (2) may also be used.

2) Error Back-propagation Computation: At this stage, the weights and biases associated with the neurons are updated according to an error gradient descent vector. The following steps are performed:

1) Starting with the output layer, and moving back toward the input layer, calculate the error terms and local gradients, as follows:

$$\varepsilon_k^{(s)} = \begin{cases} t_k - o_k^{(s)} & s = M \\ \sum_{j=1}^{N^{(s+1)}} w_{jk}^{(s+1)} \delta_j^{(s+1)} & s = 1, \ldots, M-1 \end{cases} \quad (3)$$

where
$\varepsilon_k^{(s)}$=error term for the $k^{th}$ neuron in the $s^{th}$ layer (for output layer M, this is simply the difference between the target for the $k^{th}$ neuron and actual output of the $k^{th}$ neuron).
$w_{jk}^{(s+1)}$=synaptic weight of neuron j in the (s+1) layer, associated with the output of current neuron k.
$t_k$=target value from the provided target vector t, associated with neuron k of the output layer.
$\delta_j^{(s+1)}$=local gradient for the $j^{th}$ neuron in the $(s+1)^{th}$ layer, defined as follows:

$$\delta_k^{(s+1)} = \varepsilon_k^{(s+1)} f'(H_k^{(s+1)}) s = 1, \ldots, M \quad (4)$$

where $\varepsilon_k^{(s+1)}$ is the error term of neuron k in layer (s+1); $f'(H_k^{(s+1)})$ is the derivative of the activation function, which is calculated on the weighted sum $(H_k^{(s+1)})$, described by equation (1).

2) At the neurons, calculate the changes for all the weights as follows:

$$\Delta w_{kj}^{(s)} = \eta \delta_k^{(s)} o_j^{(s-1)} \quad (5)$$

k=1, . . . , $N^{(s)}$
j=1, . . . , $N^{(s-1)}$
where η is the learning rate.

3) Update all the weights as follows:

$$w_{kj}^{(s)}(n+1) = w_{kj}^{(s)}(n) + \Delta w_{kj}^{(s)}(n) \quad (6)$$

where k=1, . . . , $N^{(s)}$ and j=1, . . . , $N^{(s-1)}$
$w_{kj}^{(s)}(n)$=current synaptic weight.
$w_{kj}^{(s)}(n+1)$=updated synaptic weight to be used in the next feed forward iteration.

As will be explained further herein, when implementing a pipelined network embodiment Equation (6) above will modify slightly to implement an out of order weight update rule.

Training: Per-Pattern vs. Epoch

MLP training can be conducted using either a per-pattern or epoch (a.k.a. batch) training method. An epoch consists of two or more input patterns (vector). In per-pattern training, patterns are presented to the network one pattern at a time and training follows the above Equations (1) to (6). All processing for each pattern must be completed before the next pattern can be presented for training. In contrast, in epoch training all patterns are presented and only the above Equations (1) to (5) are calculated. Once the Δw (i.e. the change for all weights) from all the patterns are accumulated and averaged, weights are updated using the above Equation (6). Thus the weights of the network are updated only once per epoch. Typically in a training session all epochs have the same number of patterns.

Architecture Overview: Scalability, Efficiency and Pipelining

The following description focuses on an architecture for a customized scalable network with N network layers, where the customized scalable network has a variable degree of parallelism. The customized scalable network may also be pipelined. Further, the customized scalable network may provide for a variable arithmetic representation.

A. Scalability—Variable Degree of Parallelism

Since ANNs have an inherently parallel processing architecture, it is important to have a similarly parallel processing architecture on the hardware device, an FPGA in this example, to take advantage of this inherent parallelism and maximize performance. Generally, hardware devices are chosen to provide a maximal degree of parallelism for the ANN being implemented, however, it may not always be possible to provide a maximal degree of parallelism.

Different levels of hardware parallelism for ANN computations include: training session parallelism, training example parallelism, layer and forward-backward parallelism (i.e., pipelining), node (neuron) level parallelism, weight (synapse) parallelism and bit parallelism.

The chosen level of parallelism to be implemented will generally depend on the constraints imposed by the ANN topology and algorithm to be implemented and the hardware device platform.

The embodiments described herein are intended to provide an architecture, systems and methods for implementing different levels of parallelization, such as variable neuron parallelism, variable layer parallelism and variable synapse parallelization. For ease of explanation, the embodiments described herein generally implement synapse parallelism of variable degrees corresponding to the degree of parallelism selected for the scalable network, while implementing full neuron level parallelism, full layer and forward-backward parallelism, and full bit parallelism (i.e. treating all bits of a number simultaneously). However, it should be understood that each different network level (e.g. neuron, layer, synapse, bit, etc.) may also have parallelism of variable degrees corresponding to the degree of parallelism selected for the scalable network, Referring now to FIG. 2 there is shown examples of three types of hardware parallelism for ANN computations. Black colored components represent active components while gray colored represent inactive components.

FIG. 2(a) illustrates an example of node parallelism, where a synapse 130 simultaneously provides input to all nodes 140.

FIG. 2(b) illustrates an example of synapse parallelism, where all synapses 130 simultaneously provide input to a node 140.

FIG. 2(c) illustrates an example of node and synapse parallelism, where all synapses 130 simultaneously provide input to all nodes 140.

Forward-backward parallelism relates to the parallel computation of both the feed forward stage and back propagation stage.

In the embodiments herein, scalability of the network is achieved by using a variable degree of parallelism. This means that different networks, or even the same network, are implemented with an architecture allowing for different degrees of parallelism depending on, for example, the available resources on the hardware device(s) for use in the implementation, such as for example the number of multipliers and memory blocks (e.g. block rams) it contains.

The ability to vary the degree of parallelism in the architecture without a redesign allows the designer the flexibility to trade off network performance for resources consumed. Networks with small topologies can have full parallel implementation on the hardware device thus maximizing performance while networks with large topologies may have partial parallelism in order to fit into limited available resources of the hardware device(s).

As used herein, the degree of parallelism generally relates to the number of clock cycles needed to issue an entire input vector (pattern) through one stage (or layer) of the network. Parallelism degree of one represents a fully parallel hardware configuration where each hardware stage is issued the entire input vector in one clock cycle.

Figure 3:
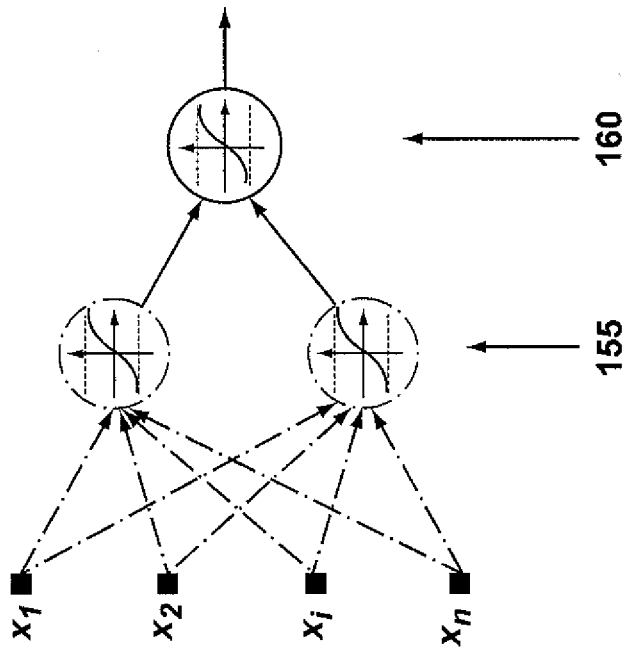
FIG. 3 illustrates an example diagram of a network having a degree of parallelism of one.
Figure 3:
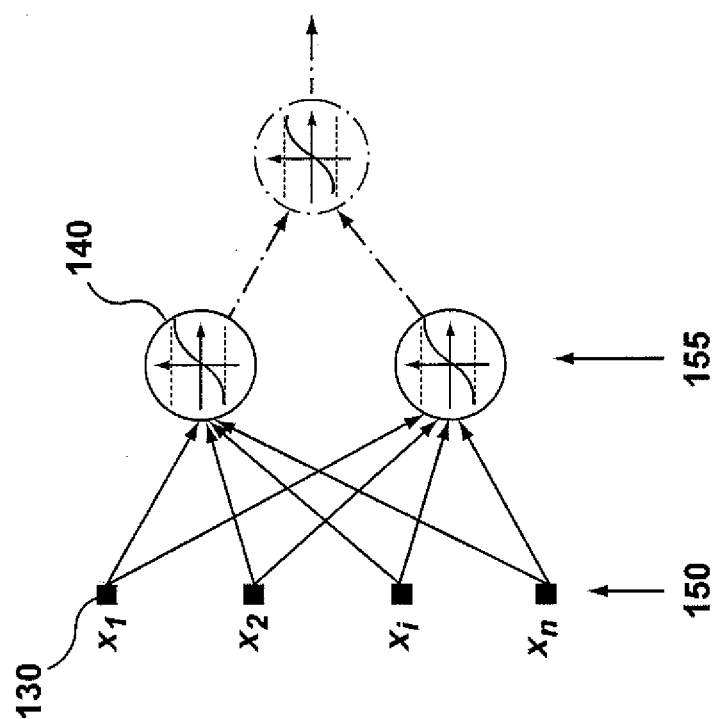

Referring now to FIG. 3, there is shown an example diagram of a network having a degree of parallelism of 1. This represents a fully parallel hardware configuration where each hardware stage is issued a single input pattern 150 (or previous layer output) in one clock cycle.

In stage 1, the hidden layer 155 (i.e. neurons 140) is issued the entire input vector 150 [x1, x2, xi, xn] (i.e. synapses 130) in one clock cycle. The input vector is then processed through the hidden layer achieving both node and synapse parallelism.

In stage 2, the entire output of the hidden layer 155 is issued to the output layer 160 in one clock cycle.

A degree of parallelism higher than one represents a partially parallel system, which facilitates hardware reuse, since each hardware stage is required to process only a portion of an input vector in one cycle. The degree of parallelism will also be referred to herein as an iterations (or ITER) parameter.

When the ITER is above one, an input pattern is divided by ITER into equal segments. For example, for an ITER of 2, an 11 input layer will be divided to 2 sets of 6 and 5 inputs. The scalable network will have only 6 physical inputs. The two sets of inputs are presented consecutively one set per clock cycle for a total of 2 clock cycles required for a complete input presentation to the first network layer. After the data is propagated through this layer, the output vector from all of its neurons is returned over 2 clock cycles as well. Considering that each layer in the network can have I/O throughput of one single vector in 2 clock cycles, these layers can be synchronized by implementing the same degree of parallelism over the entire network using a parallelization system or subsystem.

Figure 4:
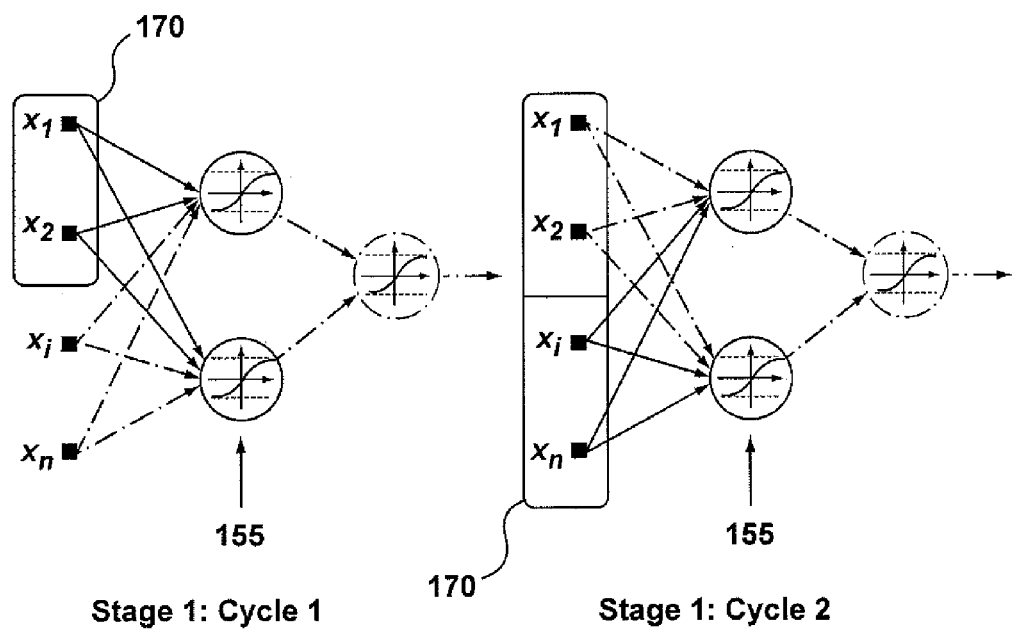
FIG. 4 illustrates an example diagram of a network having a degree of parallelism greater than one.
Figure 4:
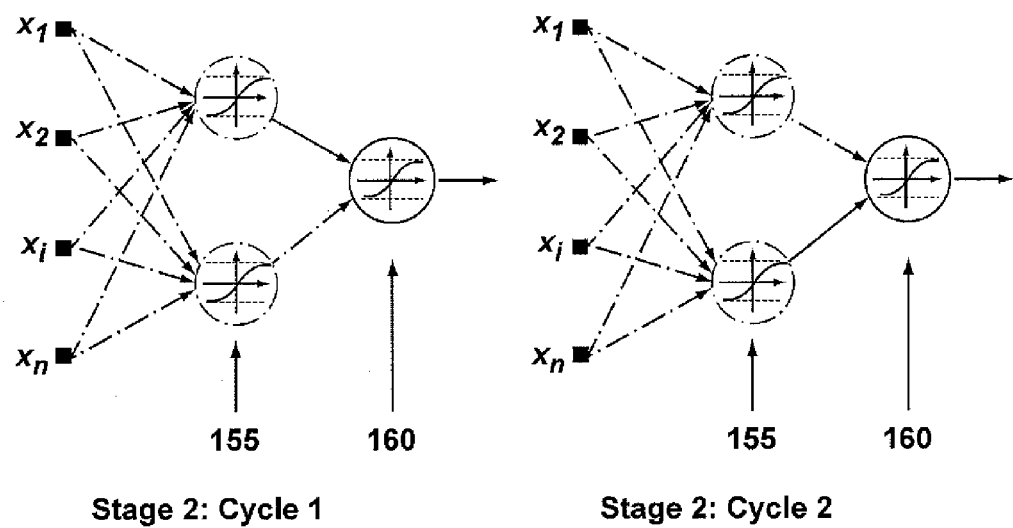

Referring now to FIG. 4, there is shown an example diagram of a network having degree of parallelism higher than 1, when ITER=2. During stage 1: cycle 1, half of the input vector 170 is issued to the hidden layer 155. In stage 1: cycle 2, the other half of the input vector 170 is issued.

In stage 2: cycle 1, half of the output from the hidden layer 155 is issued to the output layer 160. In stage 2: cycle 2, the other half is issued. In this case, there is a time between stage 1: cycle 2 and stage 2: cycle 1 needed to process the pattern through stage 1, thus stage 1: cycle 2 and stage 2: cycle 1 are not consecutive clock cycles. This means full node parallelism (e.g. all nodes active in output layer 160) but partial synapse parallelism (e.g. a node is active in hidden layer 155).

Figure 5:
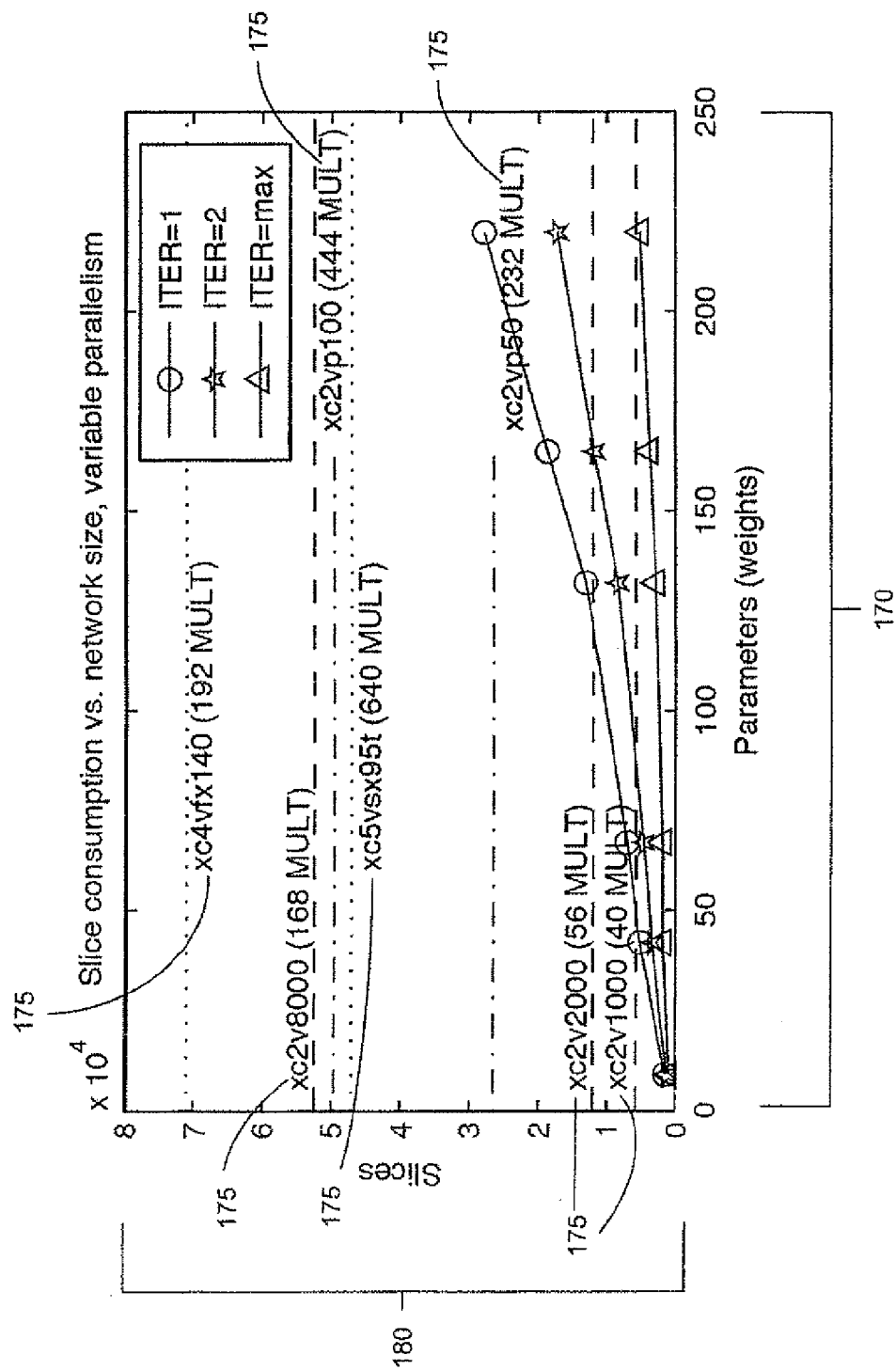
FIG. 5 illustrates an example graph showing the effects of variable degrees of parallelism on network size and slice consumption.

Referring now to FIG. 5, there in shown a graph illustrating variable degrees of parallelism and the corresponding impact on hardware device resources, using FPGAs in this example. The x-axis 170 shows the number of free parameters (weights), which loosely correlates with the computational capacity and topology size of a MLP-BP network. The y-axis 180 is the number of slices, which may generally represent FPGA resources used.

Six current Xilinx™ FPGA chip offerings 175: xc4vfx140, xc2v8000, xc5vsx95t, xavp100, xc2vp50, xc2v2000, xc2v1000, are also mapped on the graph, each associated with a respective number of available built-in multipliers they contain: 192, 168, 640, 444, 232, 56, 40. The graph also shows the difference in FPGA chip 175 architectures (e.g. xc2v8000 has more slices but less multipliers than xc2vp100).

This graph shows that when using different ITER levels, the resources needed to implement the same network change, and so does the ability to fit an entire network onto a hardware device having particular resources. For example, an ITER of 1 uses more resources given the same number of weights (e.g. 150) than if the ITER was 2.

Even though implementing the ITER feature involves an additional parrallelization system, in this new architecture, in order to select the variable degree of parallelism, a user is generally only required to supply the network topology (e.g. the number of layers and the number of neurons at each layer) and the available resources of one or more hardware devices (which e.g. provides the number of available multipliers and memory).

These variables can then be used to estimate the required resources and determine if partially parallel implementation is needed and, if so, establish the ITER value. Implementation details will be described in detail herein.

B. Efficient Implementation

Efficiency in this context means using the minimum amount of hardware device resources to achieve the required functionality and performance. The embodiments described herein are intended to allow efficient implementation on two levels: (1) variable arithmetic representation, and (2) linking network performance to resource utilization and degree of parallelism.

Variable arithmetic representation provides a way to select the arithmetic representation that allows optimal utilization of the hardware device resources while maintaining the precision level necessary to successfully achieve network training.

As noted above, linking performance to resources utilization and degree of parallelism involves using a set of formulas that estimate both the network performance and required hardware resources (e.g. memory and multipliers) of an implementation given a combination of the desired network topology, arithmetic format used, target hardware device(s) (resources available for use in the implementation), and ITER value as described in more detail below.

This allows a particular ANN implementation to vary in terms of arithmetic representation and ITER in order to achieve the most efficient and best performing implementation.

This customization is achieved for an individual network by, for example, taking full advantage of using configurable hardware, such as FPGAs or ASICs. Having both degrees of parallelism and arithmetic representation variables provides a further level of network customization.

Efficient implementation is an important factor in also having high performance. The more efficient the implementation, the higher the degree of parallelism (ITER=1 being the highest) that can be used with limited resources and thus the higher the performance that can be achieved.

C. Pipelined Design

In traditional computer architecture terminology, a pipelined architecture is generally where several instructions are overlapped in execution. In a non-pipelined architecture, each instruction is processed individually, one at a time. Execution of all processor operations associated with this instruction must be completed before the next instruction begins executing. In a pipelined architecture, the computation of each instruction is subdivided into a number of smaller sequential sub-operations (stages). One processing module for each sub-operation exists, and instructions enter each module in sequence.

For example, if each sub-operation of any instruction takes 1 second to execute, and each instruction has four sub-operations, a non-pipelined processor will execute 3 full instructions in 12 seconds. A pipelined processor executes the same instructions in 7 seconds. Theoretically one new instruction is fed into the processor at each clock cycle thus achieving the ideal one instruction per cycle rate.

Figure 6:
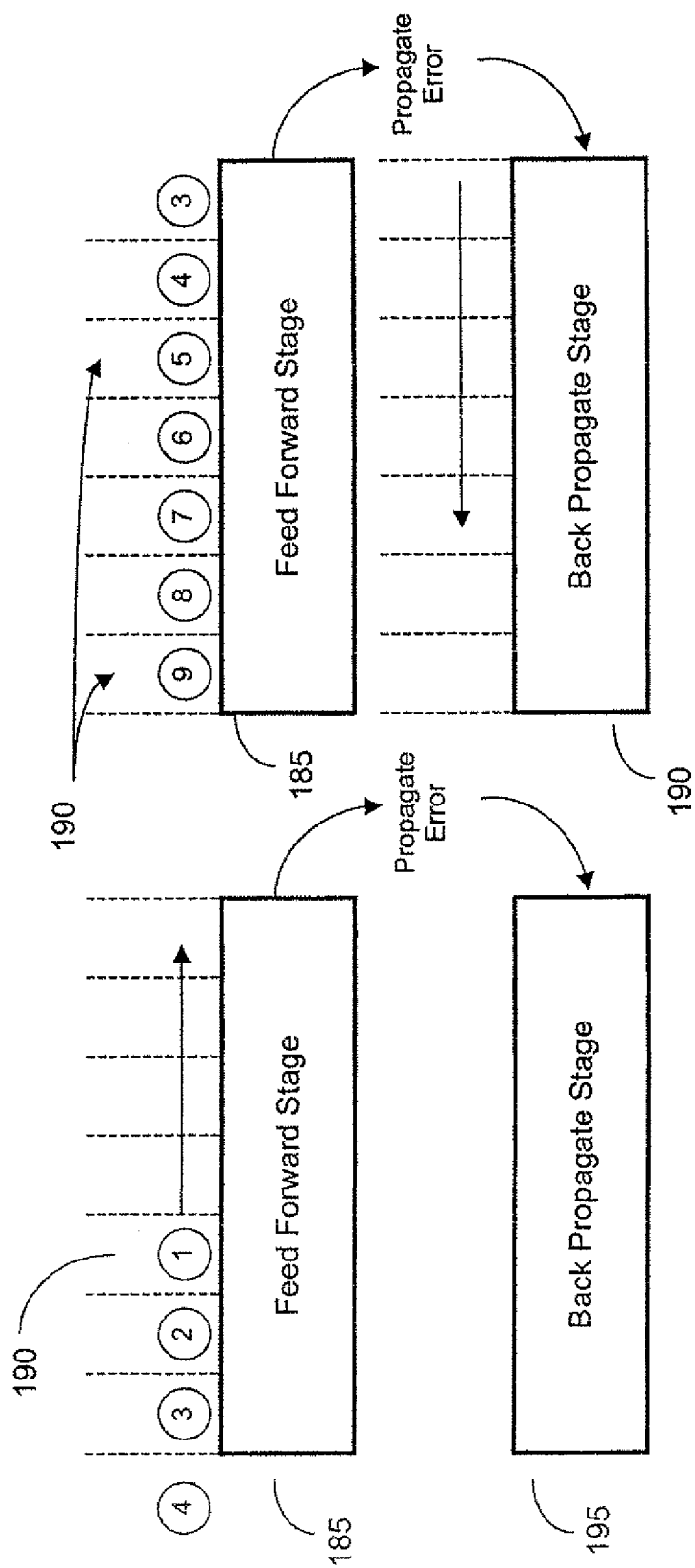
FIG. 6 illustrates an example network implementing full pipelining.

Referring now to FIG. 6, there is shown an example network architecture implementing full pipelining using per epoch training, where in this example each epoch 190 contains 4 patterns (e.g. patterns 1-4). Presentation of patterns to the network does not stop when an epoch 190 with patterns 1-4 is entirely in the pipeline. As is shown in FIG. 6, patterns for new epochs 190, such as for example an epoch 190 with patterns 5-8, are continuously presented to the network. The back propagation stream 190 of weight updates propagates at the same time as the stream of new patterns through the feed forward stage 185.

Pipelining the MLP-BP algorithm is difficult due to the fact that the algorithm requires the network to adjust its weights before and after the processing of every training pattern/batch of patterns. However, this situation creates a data hazard (e.g. read before write data hazard). Data hazards refer to situations when the pipeline must be stalled to wait for another instruction to complete execution due to the coupling of data among these instructions.

One way to resolve these data hazards is by stalling the pipeline for the same number of cycles it takes to process each pattern/batch of patterns. This effectively cancels the viability of pipelining as a strategy to increase performance of MLP-BP.

To overcome this data hazard problem we will replace the standard delta weight update rule shown above in Equation (6) with an out of order weight update which allows the continuous feed of patterns on every cycle, as shown below:

$$w_{kj}^{(s)}(n+ITER) = w_{kj}^{(s)}(n) + \Delta w_{kj}^{(s)}(n-\text{latency}) \tag{7a}$$

where latency is the number of clock cycles it takes one input pattern to process through the entire network including error gradient calculations (back propagation stage) regardless of the ITER value;

$w_{kj}^{(s)}(n+ITER)$ is the updated weight to be used in the next n+ITER feed forward iteration (i.e. clock cycle);

$w_{kj}^{(s)}(n)$ is the current weight connecting the current neuron k to the output neuron j of layer (s−1);

$\Delta w_{kj}^{(s)}(n-\text{latency})$ is the calculated change of weights for the n-latency iteration For per pattern training, Equation (7a) is used and may be herein referred to as the pattern synchronized out of order weight update rule.

For per epoch training, the following modified Equation (7b) is used and may be herein referred to as the epoch synchronized out of order weight update rule:

$$w_{kj}^{(s)}(n+ITER) = \begin{cases} w_{kj}^{(s)}(n) + \Delta w_{kj}^{(s)}(n-\text{latency})^{epoch} & \text{If the } n+ITER \text{ is the first pattern in the epoch} \\ w_{kj}^{(s)}(n) & \text{for all other patterns in the epoch} \end{cases} \tag{7b}$$

where $\Delta w_{kj}^{(s)}(n-\text{latency})^{epoch}$ the change of weights accumulated over the entire epoch which includes the n-latency iteration;

The above equations 7(a) and 7(b) updates the weights for use in the next ITER feed forward iteration (i.e. clock cycle), and is not restricted to only updating the weight to be used for the next iteration as is the case with equation (6) above. That is, the out of order weight update rule is in tune with the degree of parallelization selected for the network implementation by updating the weights for use in the next ITER iteration. When the network is non-scalable, i.e. when the ITER=1 for all network implementations, then the above equations 7(a) and 7(b) provide an out of order weight update as defined above, except that n+1 will be used instead of n+ITER (as ITER=1).

For out of order weight updates, the weight change used to update the current weight factors in a latency delay by using the calculation for the weight change of the n-latency iteration (for Equation 7a) or the accumulated weight changes including the n-latency iteration (for Equation 7b). This main feature of the out of order weight update rule does not depend on the value of ITER, and applies even for non-scalable networks (i.e. when ITER=1 for all implementations of the network).

While the above equations (pattern synchronized out of order weight update and epoch synchronized out of order weight update) effectively change the sequence of pattern presentation to the network, it doesn't appear to change the ability of the learning algorithm to achieve convergence. In particular, this represents a randomization of the sequence of pattern presentation, which empirically has been shown to improve generalization after training. If one considers the error surface of the gradient descent algorithm, the local randomization of weight updates does not change the overall direction of descent down the error gradient. In reported studies, experiments experiments on several benchmark problems indicated no negative impact on learning speed. This change is intended to overcome the pipelining data hazard and allow a significant performance increase to be achieved.

The pipeline design for the system must also deal with another issue related to the parallel computation of both the feed forward stage and back propagation stage. This can cause another read after write data hazard due to the update of weights by the backward stage while being read by the forward stage.

This second read after write data hazard may be solved by adding hardware delay elements tuned to the latency of the feed forward and back propagation pipeline stages. These delay elements ensure that the proper (updated) weight is read. As explained above, the latency is the time in clock cycles its takes one pattern (or input vector) to process through both the feed forward and back propagation stages.

Hardware Implementation Details

This section on hardware implementation details relates to configuring a scalable network having a variable degree of parallelism. Further implementation details relate to pipelined configurations of the scalable network. Even further implementation details relate to configuring a scalable network with a variable arithmetic representation.

A. Scalability—A Variable Degree of Parallelism

1) Network Level

Figure 7:
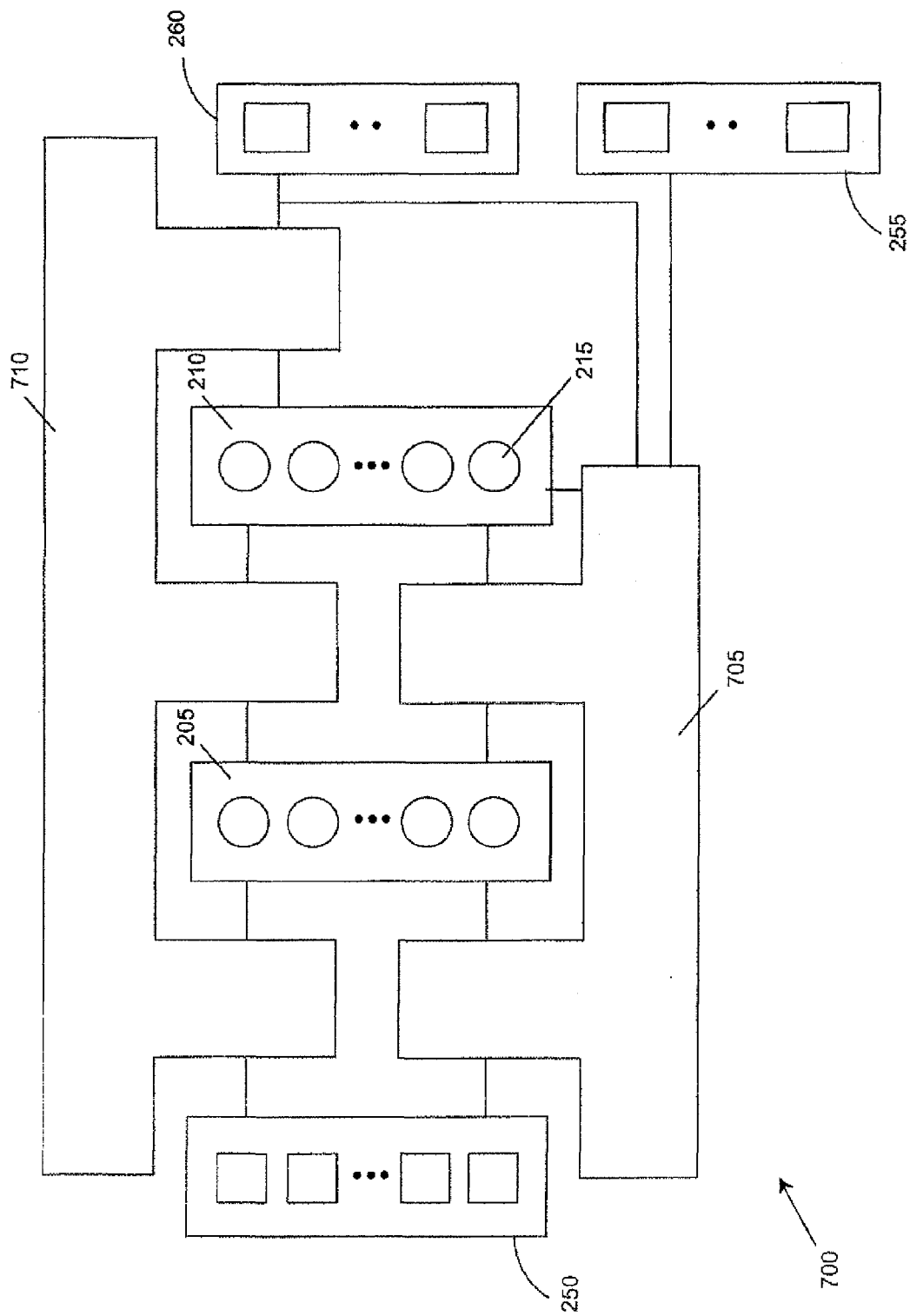
FIG. 7 illustrates a schematic diagram of an architecture for a scalable artificial neural network in accordance with embodiments described herein.

Referring now to FIG. 7 there is shown a schematic diagram of an example architecture of a scalable ANN 700 in accordance with embodiments described herein.

The scalable ANN architecture 700 has an input layer 250, at least one hidden layer 205 and an output layer 210. The scalable ANN architecture 700 also has a back-propagation system 710 configured to feed error data back through the output layer 210 and at least one hidden layer 205. The error data is generally an error gradient calculated using output 260 (generated by the scalable network 700) and a target 255 (the intended or desired output).

Further, the scalable ANN architecture 700 has a parallelization system 705 configured to provide a predetermined degree of parallelization to each of the input layer 250, at least one hidden layer 205, output layer 210 and the back-propagation system 705. As will be explained herein, the predetermined degree of parallelization is based in at least some embodiments on a desired network topology and an estimate of the hardware resources available.

Figure 8:
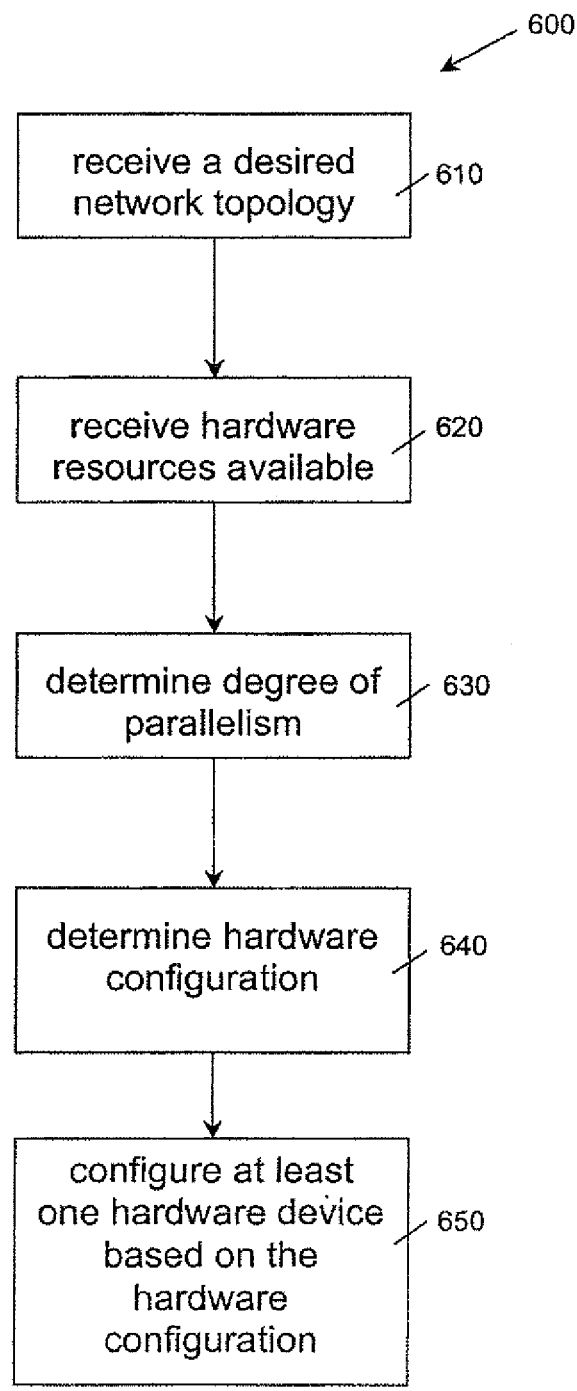
FIG. 8 illustrates a flowchart diagram of a method for designing a hardware configuration for a scalable artificial neural network in accordance with embodiments described herein.
Figure 20:
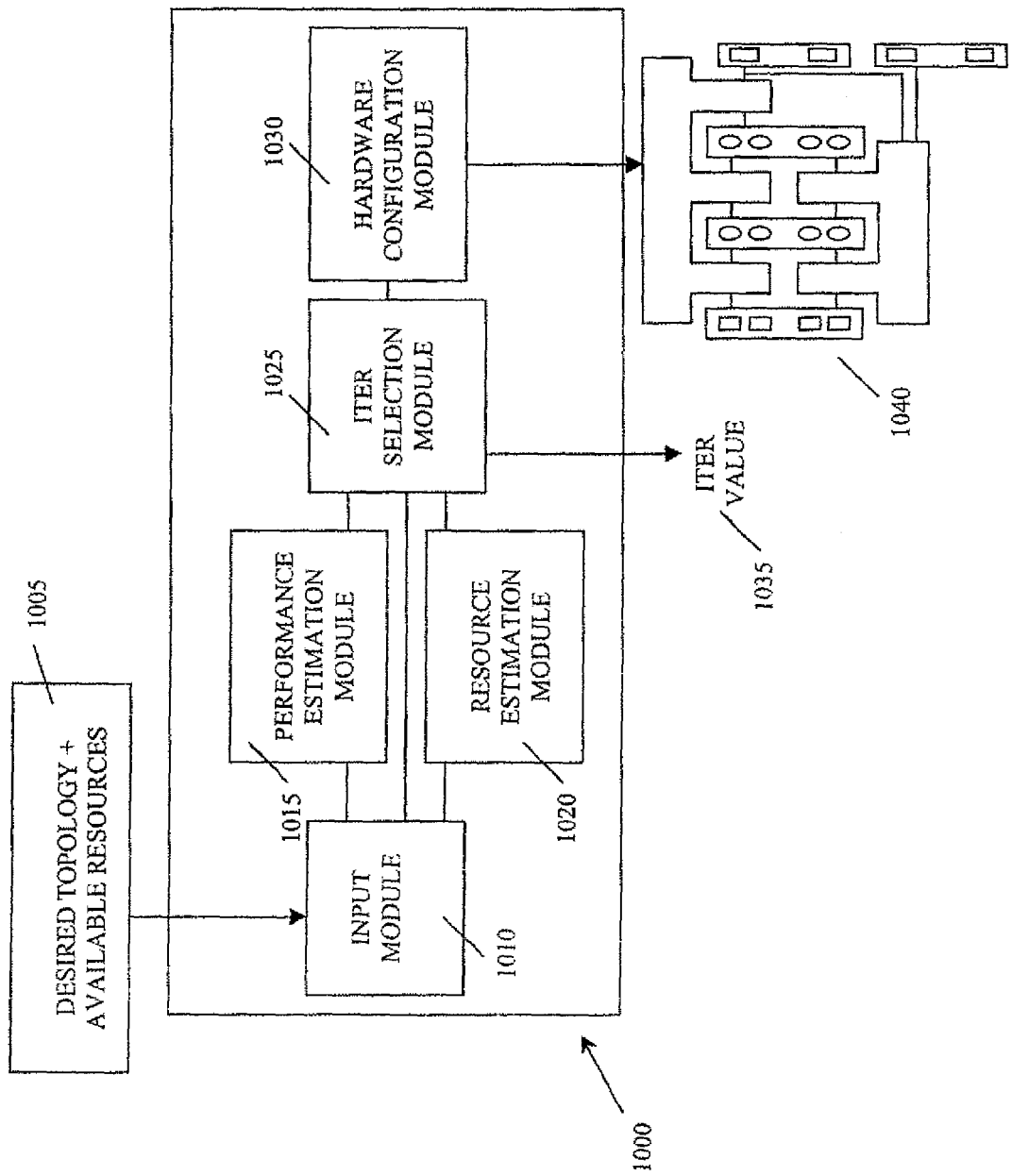
FIG. 20 illustrates a schematic diagram of a system for designing a hardware configuration for a scalable artificial neural network in accordance with embodiments described herein.

Referring now to FIG. 8 there is shown a flowchart diagram of an example method 600 for designing a hardware configuration for a scalable ANN in accordance with embodiments described herein. Certain steps of the method 600 may be implemented by a system for designing a hardware configuration for implementing a scalable artificial neural network, such as the example system 1000 illustrated in FIG. 20. The system components may be implemented in software, by hardware description languages or by various hardware platforms.

At step 610, a desired network topology 1005 is provided to the system 1000 and received by input module 1010. The desired network topology 1005 relates to the theoretical ANN that will be implemented as a scalable ANN on at least one hardware device. The desired network topology 1005 provides the number of theoretical inputs, the number of neurons in theoretical hidden layers, and the number of neurons in a theoretical output layer 110. An example desired network topology is 12-6-10, with 12 inputs, 6 neurons in the hidden layer(s), and 10 neurons in the output layer. The desired network topology is generally not equivalent to the topology of the scalable ANN to be implemented on the hardware device, unless the degree of parallelism of the scalable network is one.

At step 620, information relating to hardware resources available 1005 on one or more hardware devices for use in implementing the scalable ANN 700 is provided to the system 1000 and received by input module 1010. As noted above, the available hardware resources 1005 may describe resources of one or more hardware devices of various types and combinations of types, such as FPGAs, processors, and ASICs. The available hardware resources 1005 will generally constrain which degree of parallelism the scalable network 700 has, as the given implementation must use an amount of resources that is within the amount of resources available for the actual hardware.

At step 630, the ITER selection module 1025 selects a degree of parallelism to use for implementing the scalable network 700 based on the hardware resources available and the desired network topology 1005. The ITER selection module 1025 receives the available hardware resources and desired topology 1005 from the input module 1010. The ITER selection module 1025 also bases the selection on estimations relating to resource utilization and network performance, which are calculated by a resource estimation module 1020 and a performance estimation module 1015 respectively. Details of these estimations are provided herein in relation to FIG. 19, and Equations (11) to (14). Generally, the ITER selection module 1025 selects the degree of parallelism that provides the best network performance and uses less than or all of the available resources 1005.

The ITER selection module 1025 provides the selected ITER value 1035 to a hardware configuration module 1030. In some embodiments, the selected ITER value 1035 may also or alternatively be directly output by the system 1000 for use in designing the scalable network 700.

At step 640, the hardware configuration module 1030 determines a hardware configuration 1040 based on the degree of parallelism or ITER value 1035 selected. Generally speaking, the hardware configuration 1040 conforms to the architecture of FIG. 7 but with a customized arrangement of physical neurons (e.g. perceptrons) based on the degree of parallelization.

In keeping with the architecture of FIG. 7, the hardware configuration 1040 also provides hardware implementation details for a back-propagation system 705 for feeding error data back through the output layer 210, and at least one hidden layer 205 as well as a parallelization system 710 configured to provide the selected degree of parallelization 1035 to each of the input layer 250, hidden layer(s) 205, output layer 210 and the back-propagation system 710.

The hardware configuration may be output in various formats, for example in a hardware description language, which can later be used to configure a specific hardware device such as an FPGA or ASIC. Hardware description language examples include VHDL, Verilog, HandelC and SystemC.

Finally, in some embodiments, at step 650, the hardware configuration module 1030 configures one or more hardware devices based on the hardware configuration 1040 to provide a hardware device having a specific implementation of the scalable network architecture 700 (FIG. 7). The hardware device(s) may be of various types and/or combinations of types, such as FPGAs, processors, and ASICs.

Figure 9:
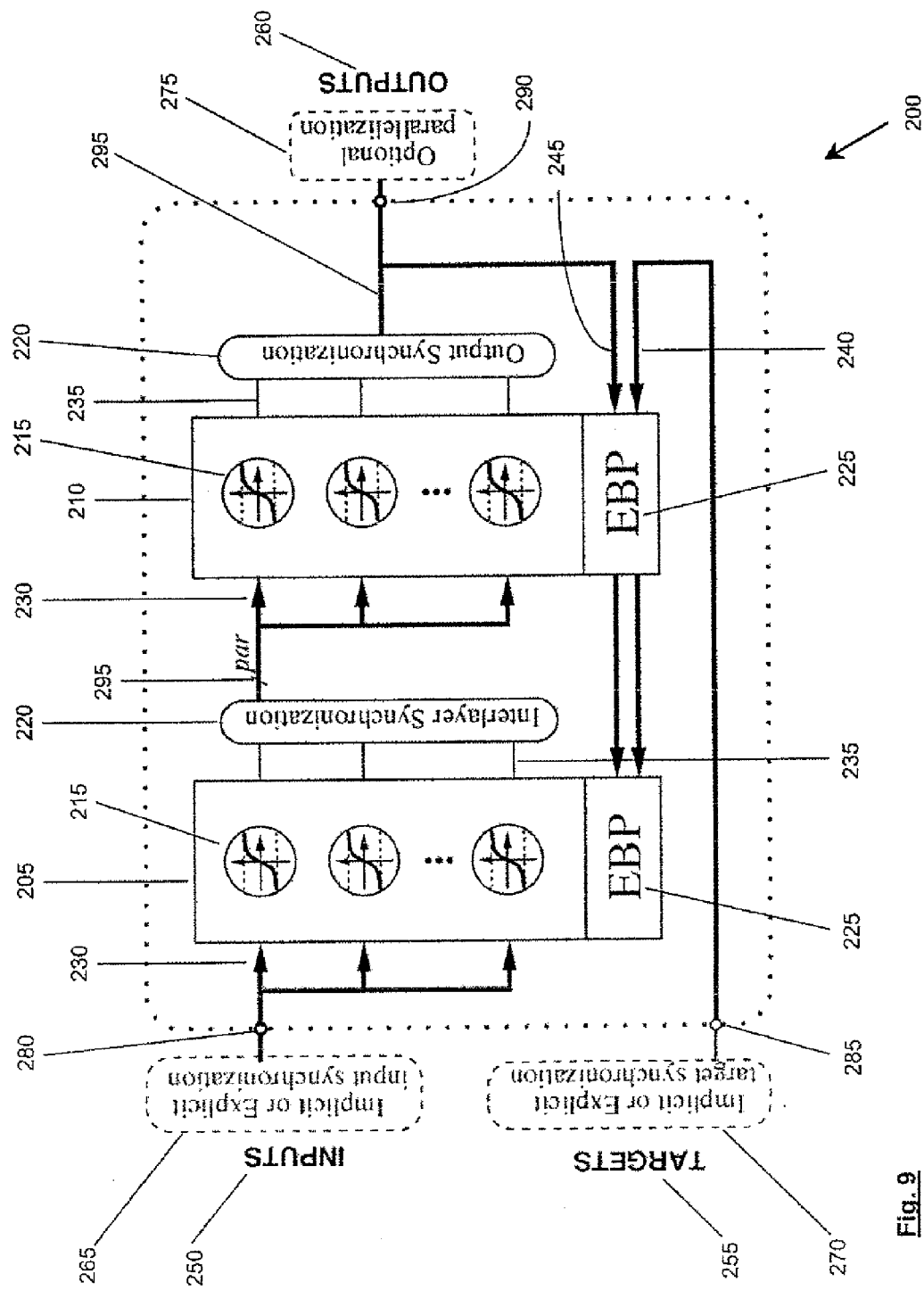
FIG. 9 illustrates a schematic diagram of an example network having a variable degree of parallelism in accordance with embodiments described herein.

Referring now to FIG. 9 there is shown a more detailed schematic diagram of a further example network architecture 200 capable of implementing variable degrees of parallelism in accordance with embodiments described herein.

The network 200 is shown having two layers: one hidden 205 and one output layer 210, multiple synchronization blocks 220 (i.e. components of the parallelization subsystem 710), and error back propagation (EBP) modules 225 (i.e. components of the back propagation subsystem 705). More than one hidden layer 205 may be used since the implementation is modular, however, only one layer is shown and described for simplicity.

Each network layer 205/210 has multiple neurons 215 in a full neuron parallelism configuration and a throughput or synchronization block 220. Each synchronization block 220 is a component of the parallelization subsystem 710.

The synchronization blocks 220 translate the parallel outputs 235 from neurons 215 in one layer 205/210 into a synchronized sequence 295 (i.e. serialized feed forward data) appropriate for input 230 to neurons 215 in the next layer 205/210. The synchronization blocks 220 receive neuron output 235 every clock cycle and therefore receive all outputs for the layer every ITER number of cycles. The synchronization blocks 220 generate the synchronized sequence 295 using the received output for input to the next layer at every clock cycle.

Referring to the above example, parallel outputs 235 from neurons 215 of the hidden layer 205 are received by synchronization block 220 every ITER number of cycles and provide a synchronized sequence 295 every clock cycle for input 230 to neurons 215 of the output 220 or subsequent hidden layer 205. That is, one parallel output is provided to the synchronization block 220 every ITER cycles, which is partitioned into one synchronized output consisting of ITER number of (almost) equal chunks to be provided to neurons 215 of the next layer over ITER number of cycles.

Effectively each layer 205/210 of the network 200 is implementing partial synapse (i.e. the neurons 215 in the previous layer 205/210) parallelism at its inputs 230. That is, each neuron 215 of a layer 205/210 receives input 230 during one clock cycle, which is either a full input vector or part of an input vector depending on the ITER value.

For example, when ITER=1 all synapses are physically implemented on the hardware device and an input pattern or vector is fully presented to a network layer each clock cycle. In this case, the synchronization module/blocks may still be present in the architecture but the degree of parallelization (ITER value) will be set to one.

When the ITER>1, only 1/ITER multiplied by the number of all theoretical synapses (i.e. the synapses of the desired topology) are physically implemented on the hardware device. In this case, the input is partitioned into ITER number of parts and these partitioned parts are then provided to the physical synapses (or neurons 215) over consecutive ITER clock cycles.

As a result of all layers 205/210 being throughput synchronized by the synchronization blocks 220 using the same ITER parameter, the inputs 240/245 to the EBP modules 225 are carried backward in a format that is already correctly reduced in width. No further synchronization is generally necessary in the back propagation path of the network 200.

The input vector 250 for network 200 undergoes implicit or explicit synchronization 265 in order to provide a synchronized sequence 295 appropriate for input 230 to the neurons 215 of the first hidden layer 205 of the network 100. The implicit or explicit synchronization 265 is also a component of the parallelization system 710.

The target vector 255 also undergoes implicit or explicit synchronization 270 to provide appropriate input 240 to the error back propagation (EBP) calculations module 225. For example, the input vector 250 and the target vector 255 can be presented either as an already synchronized data stream, with chunks at every clock cycle, or by using one parallel vector, valid once every ITER number of cycles with an implicit synchronization performed in hardware. The implicit or explicit synchronization 270 is also a component of the parallelization system 710.

The former configuration relating to the synchronized data stream requires some form of implicit data set decomposition 265/270 in order to implicitly partition both the input vector 250 and target vector 255 into ITER number of parts either before a training session or at run-time. The latter configuration relating to the one parallel vector requires an explicit use of a throughput synchronization module 265/270 at the inputs, in order to explicitly partition both the input vector 250 and target vector 255 into ITER number of parts but does not require additional data flow control beyond pattern storage.

The same considerations can be applied at the final network output 260. The throughput synchronized output data 295 can be fed through an explicit parallelization block 275, or can be used as is in its reduced form. Either way both configurations provide the final network output 260.

For both input (e.g. input line 280 and target line 285) and output (e.g. output line 290) connections, in accordance with some embodiments it is preferred to present and consume the data (e.g. input 250, target 255, and output 260) in an already throughput synchronized form, i.e. partitioned into ITER number of parts. This may reduce the I/O requirements of the network 200 in line with the ITER parameter. As an example, if ITER=4, four times less input 280, target 285 and output 290 lines are required to communicate with the architecture.

Each input 250 to the network 200 is presented with an accompanying virtual address (not shown). The address determines which virtual network this input 250 belongs. As the data propagates through the hardware, the virtual network 200 specified effectively gets trained (or accessed during recall) on the input pattern 250 and output 260/target 255 combination. Each pattern 250 presented, whether over one or several clock cycles, can belong to a different virtual network. If a training epoch for a given virtual network 200 consists of more than one pattern 250, all patterns 250 within this epoch are presented together as well. A different virtual network 200 can be accessed for every epoch presented during training, or every pattern 200 tested during recall.

2) Layer Level

Figure 10:
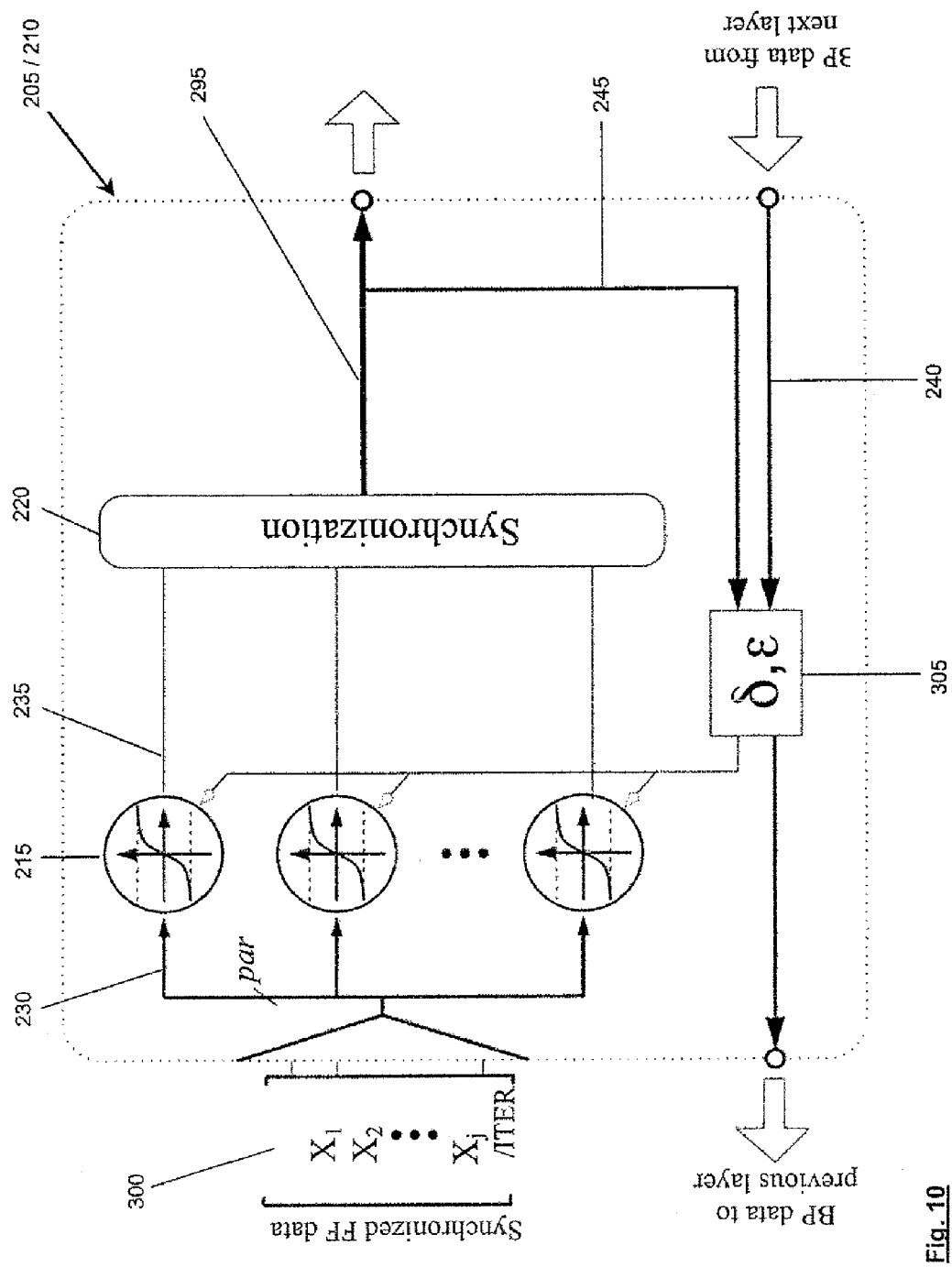
FIG. 10 illustrates an example schematic diagram of the internal structure of a layer of a network having a variable degree of parallelism in accordance with embodiments described herein.

Referring now to FIG. 10, there is shown an example diagram of the internal structure of each layer 205/210 of the network 200 capable of implementing a variable degree of parallelism in accordance with embodiments described herein. Layers 205/210 are composed of neurons 215 in a full neuron parallelism configuration, with variable synaptic parallelism interconnecting the layers 205/210.

Depending on the given level of parallelism, all inputs 300 to a layer 205/210 can be applied in parallel, or in portions over several ITER cycles. In this example, these inputs 300 are distributed to all neurons 215 via neuron inputs 230 using a limited width bus, which has the necessary width to carry only the necessary number of inputs 230 to accommodate a given level of parallelism. The information on the input bus is appropriately synchronized with the operation of this layer 205/210 before the input presentation.

The input data 300 (synchronized sequence) is distributed and provided to all neurons 215 via neuron inputs 230 in order to calculate the output 235 of the feed forward calculation in parallel, as the data presented to each of the neurons 215 is identical at each clock cycle. As will be explained herein each neuron 215 is implemented with sufficient hardware in order to process a given number of inputs proportional to the given degree of parallelism.

A valid output vector consisting of the individual neuron 215 outputs 235 is generated by the layer 205/210 for all neurons 215 every ITER number of clock cycles. For example, if ITER=1, a valid output vector consisting of the individual neuron outputs 235 is generated by the layer 205/210 for all neurons 215 every clock cycle. If ITER>1, a valid output vector consisting of the individual neuron outputs 235 is generated every ITER number of cycles.

These parallel neuron outputs 235 are received by a synchronization block 220 and partitioned into ITER number of parts to produce of synchronized sequence 295 for input to the next layer's neurons 215.

At the layer level, the error back propagation stage is comprised of the error back propagation module 305 (i.e. EBP module 225) which receives error data, or an error gradient vector. The error back propagation module 305 generally implements the above equation (3) and equation (4) in order to generate an error term and a local gradient for each of its neurons 215. The error back propagation module 305 then provides each neuron with its corresponding error term and local gradient for use in updating the neuron weights. As such, the error back propagation module 305 is also a component of the back propagation system 705 (FIG. 7).

Figure 11:
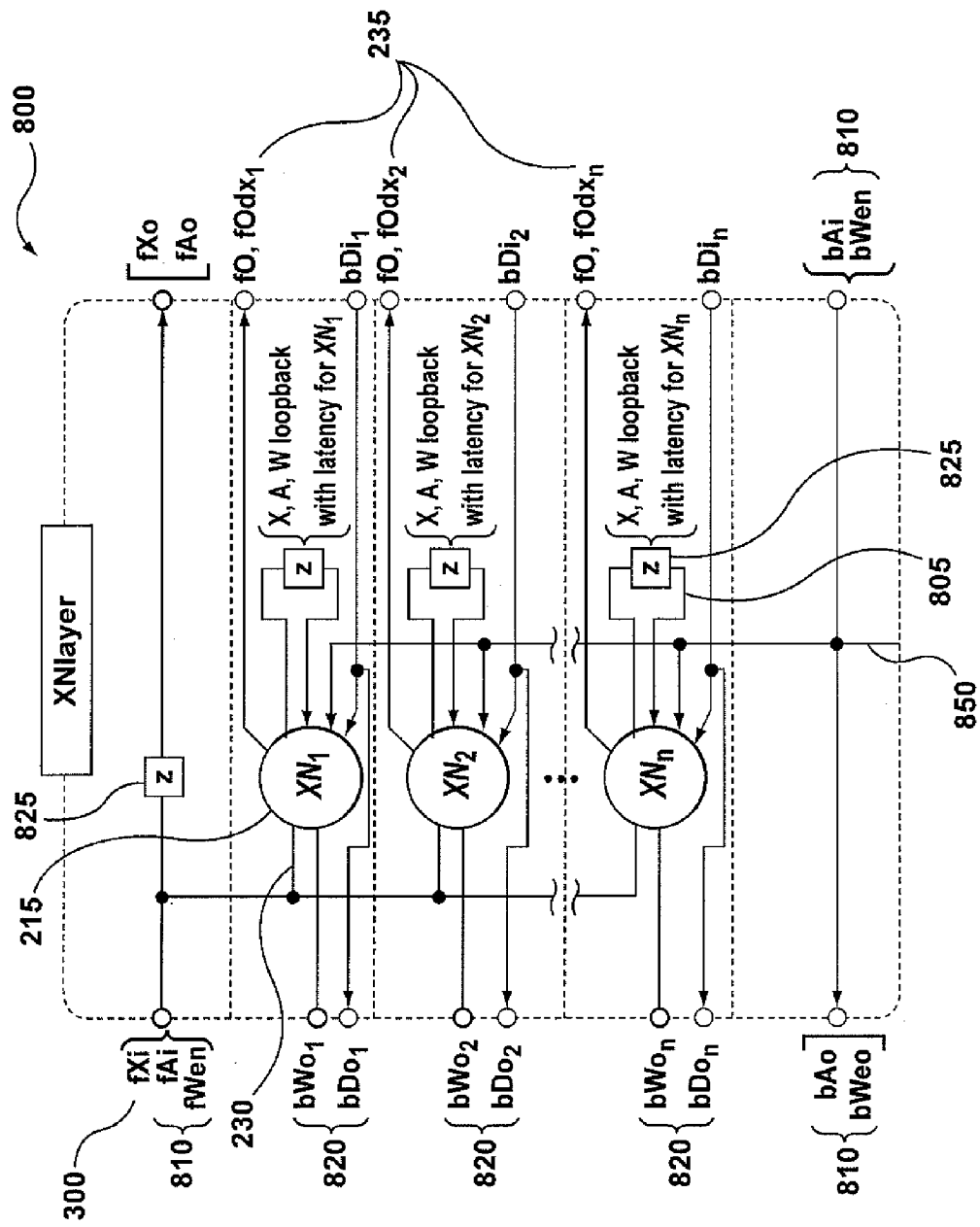
FIG. 11 illustrates an example schematic diagram of a portion of the internal structure of a layer of a network having a variable degree of parallelism in accordance with embodiments described herein.

Referring now to FIG. 11, there is shown an example hardware diagram of the internal structure of a portion 800 of each layer 205/210 of the network 200 capable of implementing variable degrees of parallelism in accordance with some embodiments described herein. The portion 800 of a network layer 205/210 contains neurons 215 in conjunction with appropriate gradient calculation hardware. The number of neurons 215 in the layer 205/210 corresponds to the size of each layer of the scalable network topology, or the size of each layer of the desired network topology divided by the given degree of parallelism. For example, if the desired network topology has a hidden layer with 10 neurons and the ITER=2, then only 5 physical neurons will generally be present in the scalable network layer 205.

The neurons 215 themselves are specified with a set of rules determining the appropriate type and number of hardware resources needed to support a given degree of parallelism.

As an example consider a given layer that receives 10 inputs (synapses) from a previous layer. For a fully parallel implementation, or when ITER=1, then each neuron of the given layer is implemented with sufficient hardware to process these 10 inputs (or synapses) simultaneously (i.e. in one clock cycle). For a partially parallel implementation, such as e.g. ITER=2, then each neuron of the given layer is implemented with sufficient hardware to process 5 inputs (or synapses) each clock cycle. Finally, for a fully serial implementation, or when ITER=10, then each neuron of the given layer is implemented with sufficient hardware to process 1 input (or synapse) each clock cycle.

For the feed forward computation stage the portion 800 of the layer 205/210 shown receives input 300 (fXi) and control signals 810 (address, write line), and provides an output vector containing output 235 from each neuron 215. The control signals 810 differentiate between training and testing mode. Neurons 215 are provided with error data via an input line 850. After the neurons weights are updated every ITER number of cycles during the back propagation stage, the neuron weights (bW) and gradients (bD) 820 are provided to the previous layer 205/210 in the network 200.

Figure 12:
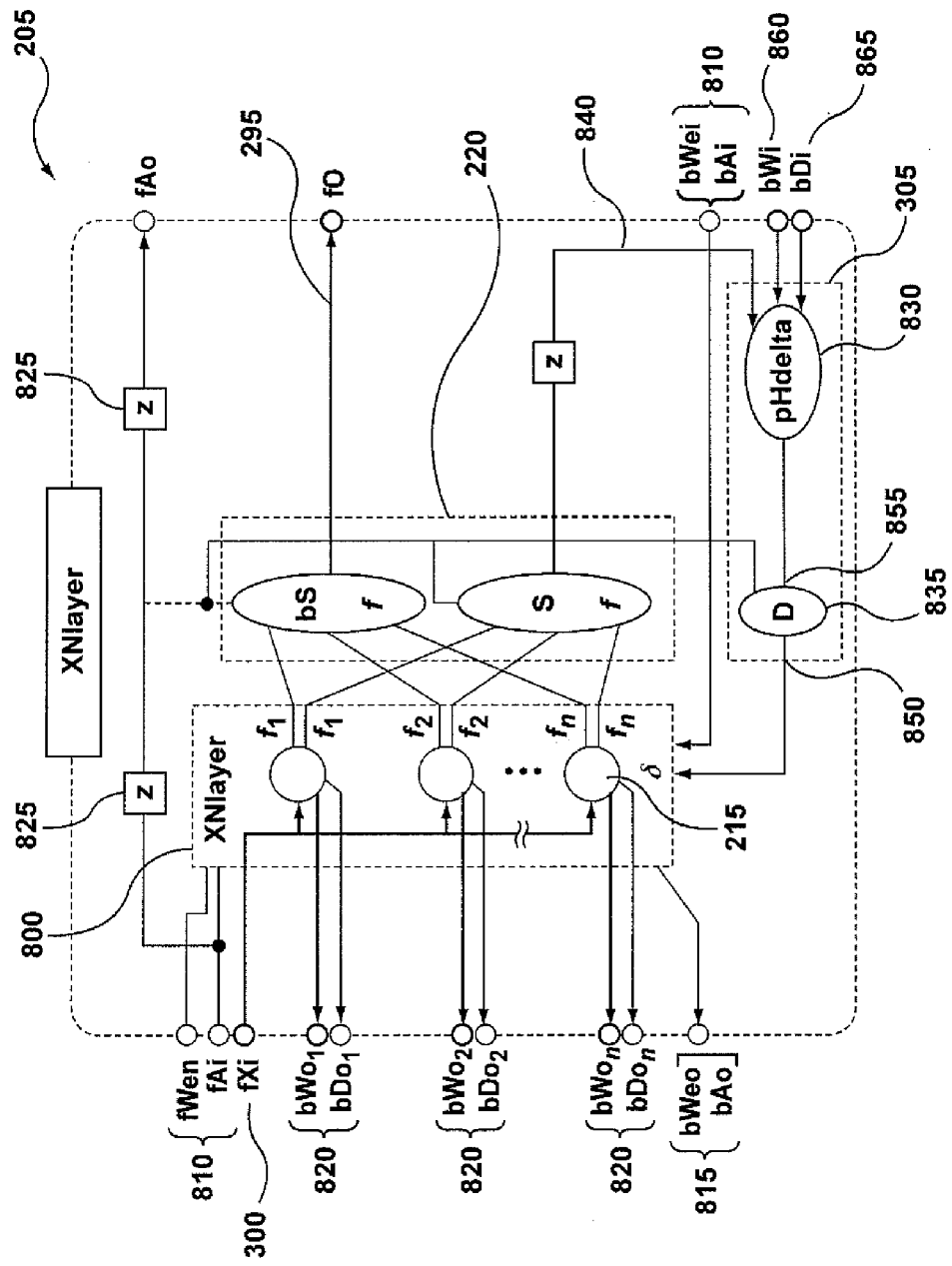
FIG. 12 illustrates a further example schematic diagram of the internal structure of a hidden layer of a network having a variable degree of parallelism in accordance with embodiments described herein.

Referring now to FIG. 12, there is shown an example hardware diagram of the internal structure of a hidden layer 205 of a network 200 capable of implementing a variable degree of parallelism in accordance with embodiments described herein. The hidden layer 205 contains: the internal portion 800 (FIG. 11), a synchronization block 220 (e.g. biased serializer in this example), pHdelta module 830, and another synchronization block 835 (e.g. a deserializer in this example).

The biased serializer 220 takes a parallel number of inputs from neurons 215 and multiplexes them into a narrower synchronized bus of ITER number of parts. The multiplexing control is provided by using the same address lines propagating through the pipeline, which determine which part of a data vector needs to be presented at the output of the serializer 220. The biased serializer 220 uses a serialized input port of a narrow width and converts it into one wide parallel output port. The final output 295 is double buffered and is updated once every ITER number of cycles to correspond to the first clock cycle of a set of patterns representing one full neuron output vector of data. The biased serializer 220 adds an additional index to its output 295 with the value of unity. This is consistent in configurations with degree of parallelism higher than unity.

The pHdelta module 830 is responsible for calculating the hidden gradient values. The gradients 865 from the output, or subsequent hidden layer (in the case of a multilayer network), are multiplied together with the weights 860 from each of the subsequent layer's neurons 215 corresponding to the outputs 820 of the current layer 205. When ITER>1, this multiplication is done in ITER sets, and the final result is accumulated and then multiplied by the derivative of the transfer function 840.

Figure 13:
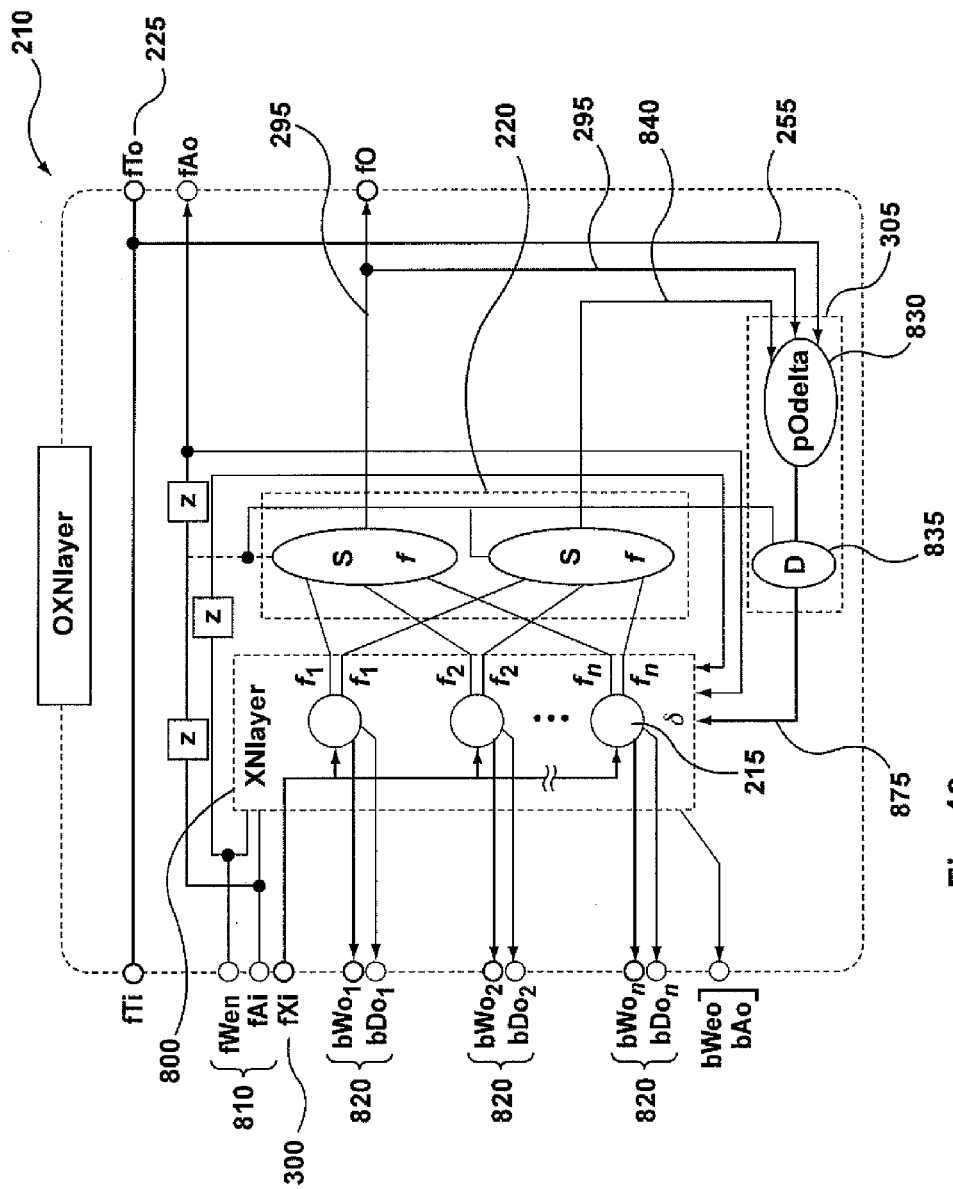
FIG. 13 illustrates a further example schematic diagram of the internal structure of an outer layer of a network having a variable degree of parallelism in accordance with embodiments described herein.

Referring now to FIG. 13 there is shown a detailed example hardware diagram of the internal structure of an outer layer 210 of a network 200 capable of implementing a variable degree of parallelism in accordance with embodiments described herein. The outer layer 210 contains: the neuron portion 800, a synchronization block 220 (e.g. a serializer in this example), pHdelta module 830, and another synchronization block 835 (e.g. a deserializer 835 in this example). The serializer 220 is similar in function to the biased serializer 220 except it does not add an additional unity index to its output 295.

The outputs of the neurons 215 in the outer layer 210 are synchronized together with the transfer function derivative 840, according to the degree of parallelism ITER selected at synthesis. The serialized outputs 295 (network output 260) and transfer function derivatives 840 are passed to the pHdelta module 830, together with the serialized target vector. A local gradient 875 is calculated for every neuron 215 in ITER number of cycles, these local gradients 875 are then synchronized by deserializer 835 (i.e. synchronization block 835) and applied in parallel to each neuron 215 in the outer layer 210.

3) Neuron Level

Figure 14:
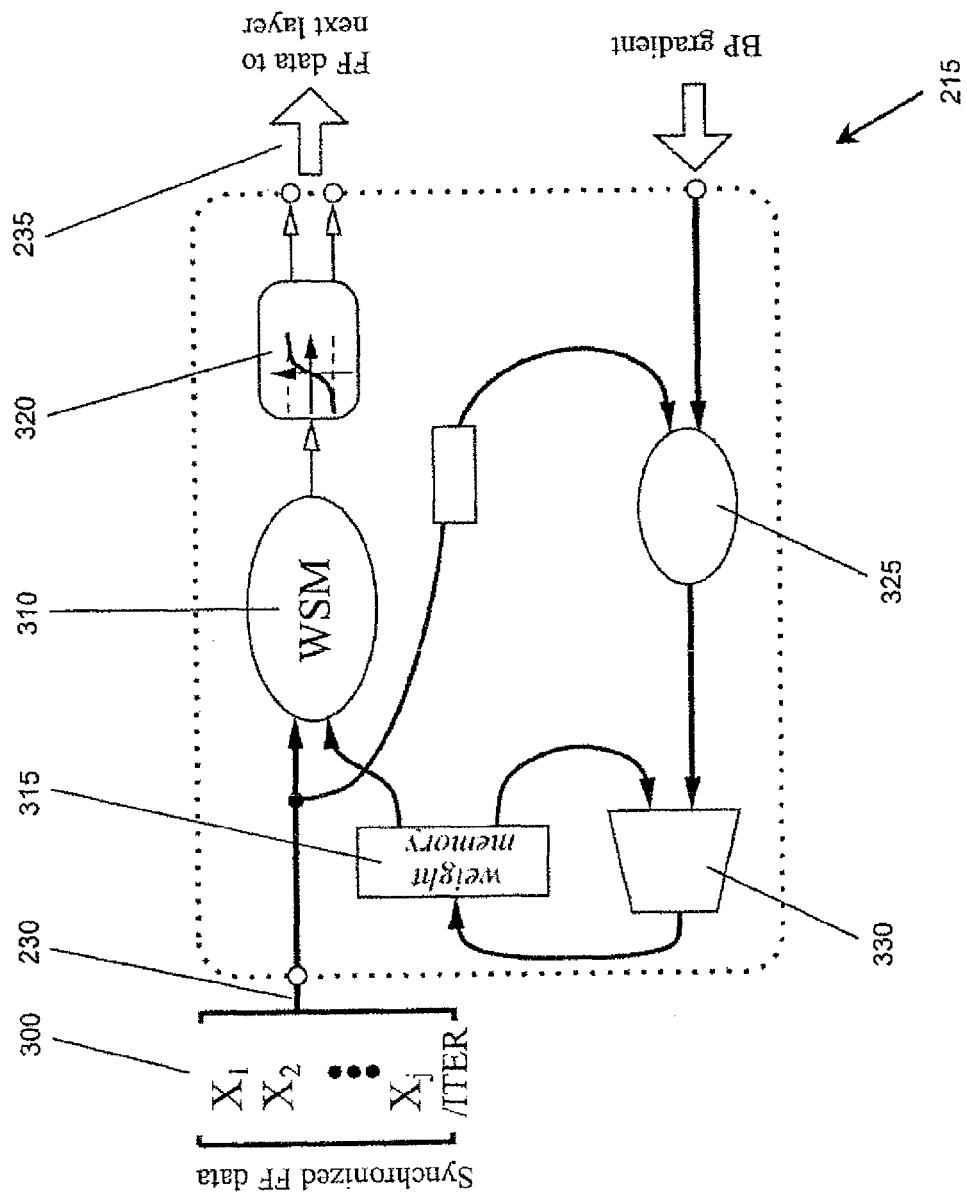
FIG. 14 illustrates an example schematic diagram of the internal structure of a neuron of a network having a variable degree of parallelism in accordance with embodiments described herein.

Referring now to FIG. 14 there is shown an example diagram of the structure of each individual neuron 215 capable of implementing a variable degree of parallelism in accordance with embodiments described herein. The number of synthesized inputs 300 (herein par) feeding a neuron 215 is selected using the number of synthesized synapses. As such, par is determined by the network topology and the ITER parameter, as in Equation (8):

$$\text{par} = \left\lceil \frac{\text{synapses}}{\text{ITER}} \right\rceil \quad (8)$$

A neuron 215 generally has a weighted sum module 310, a weight memory 315, and a transfer function module 320 for performing the feed forward calculations. The weight memory 315 may include one or a plurality of physical weight memories. In addition, a neuron 215 generally has a weight change module 325 and a weight update module 330 for performing the error back propagation calculations.

The weight memory 315 holds the weights associated with the neuron. The size and width of the weight memory is determined by the number of inputs 300, or par. The weight memory 315 has a read port in connection with the input of the weighted sum module 310 for weight recall. The weight memory also has a read port in connection with the input of the weight update module 330 for weight recall, and a write port in connection with the output of the weight update module 330 to write the updated weight value to memory, as will be explained herein.

The neuron input 230 provides the synthesized inputs 300 to weighted sum module 310 which implements Equation (1) and determines the weighted input sum for the neuron. The number of inputs (par) determines the width of the weighted sum module 310. If more than one cycle is required to calculate the weighted input sum, the result of partial weighted sums are accumulated over the ITER number of cycles required to complete the calculation.

The weighted sum module 310 provides the weighted input sum to the transfer function module 320, which generates the output 235 of the neuron 215 by generally implementing Equation (2) or an approximation thereof (see Equations (9) and (10) below). As explained above, the neuron output 235 makes up part of its layer's output vector, which is then synchronized at the synchronization block 220 every ITER number of cycles to provide feed forward data for the next layer.

At the neuron 215 level, the error back propagation stage is composed of a weight change module 325 and a weight update module 330 in connection with the weight memory 315, as explained above.

The weight change module 325 generally performs the calculation of Equation (5) to determine the weight changes for the neuron 215, using the output of the previous layer (or this neuron's input 230) and the local gradient provided in the back propagation data path from its layer's error back propagation module 305. That is, the weight change module 325 determines the changes to the weights for the neuron 215 by multiplying the output from the previous layer (i.e. the input vector 300) with the local gradients, and a learning rate. When implementing an out of order weight update, weight change module 325 generally performs the calculation of Equation (5) and factors in a latency delay. That is, instead of calculating the change for the current weight n, the weight change for the weight of the n-latency iteration (i.e. clock cycle) is calculated or the accumulated weight change including the n-latency iteration is calculated depending on the training pattern used.

The weight change module 325 provides the weight changes to the weight update module 330 to complete the weight update by generally implementing Equation (6). That is, the weight change module 325 reads the currents weights from the weight memory 315 and updates them using the received weight changes. These updated weights are then stored in the weight memory 315 for recall. In some embodiments where pipelining is used, the weight update module 325 implements the above Equation (7a) or (7b), depending on the training technique, instead of Equation (6), in order provide out of order weight update. As noted above, when implementing an out of order weight update for a given weight n, the weight change module provides the weight update module with the weight change calculated for the weight of the n-latency iteration (i.e. clock cycle) or the accumulated weight change for use in updating weight n according to Equations (7a) or (7b) respectively.

The width of the back propagation data path is determined by a combination of the corresponding layer's size (number of neurons 215) and the degree of parallelization selected, similar to the computation of the forward layer's input bus width.

As explained above, the calculations of Equations (3) to (4) are performed at the layer level by the error back propagation module 305. That is, the error back propagation module 305 calculates the error terms and local gradients for each neuron in its layer. This is done to improve the efficiency of allocated arithmetic resources, as the calculation of Equation (3) benefits from a global connection to run-time variables of the following layer 205/210 of neurons 215. In this way, again, only necessary hardware is allocated to perform the calculations of the inherent MLP-BP arithmetic, and resource allocation inefficiencies arise only when the output width is not wholly divisible by the ITER parameter. That is, a portion of the allocated hardware idles for one of ITER number of cycles for the inputs generated during the roundoff in Equation (8).

Figure 15:
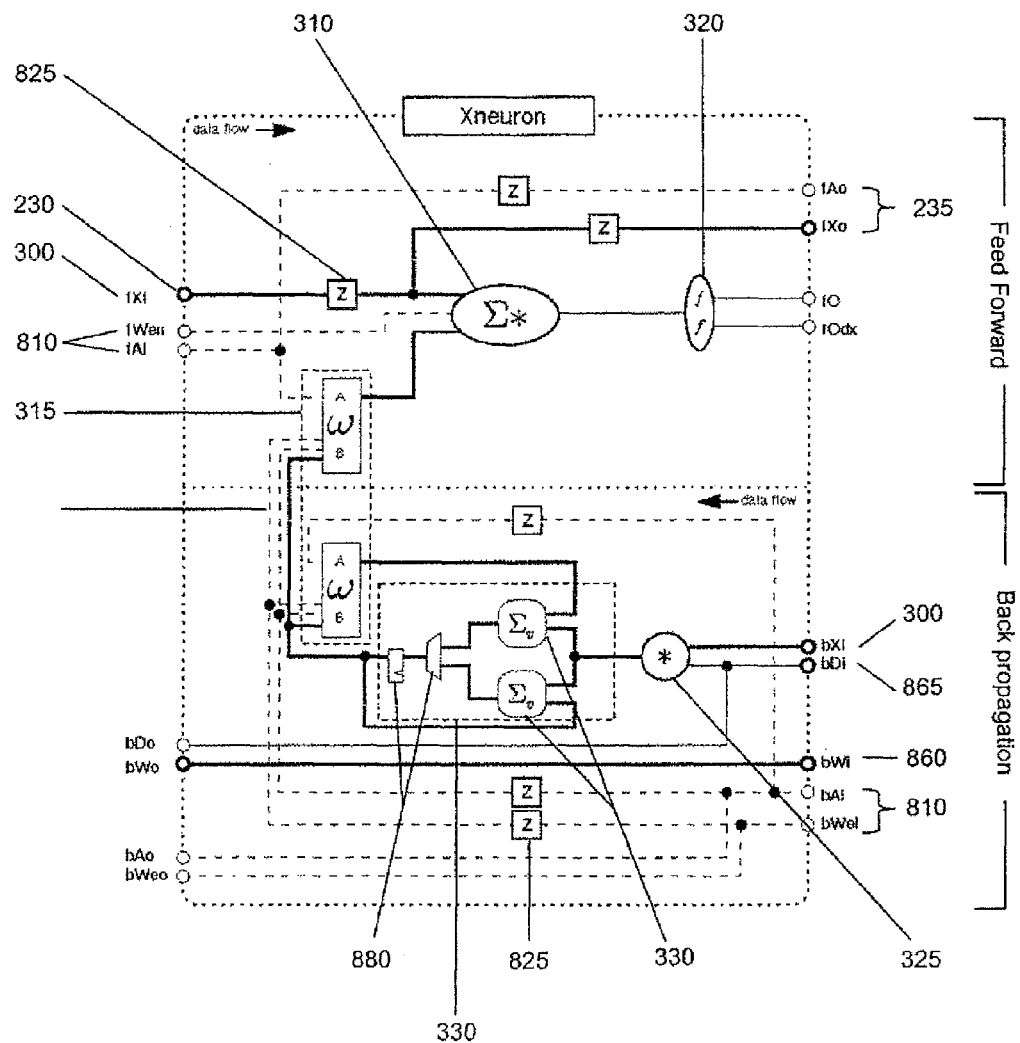
FIG. 15 illustrates a further example schematic diagram of the internal structure of a neuron of a network having a variable degree of parallelism in accordance with embodiments described herein.

Referring now to FIG. 15 there is shown another example schematic diagram of the hardware structure of each individual neuron 215 capable of implementing variable degrees of parallelism in accordance with embodiments described herein.

The top portion of the schematic in FIG. 15 represents network hardware for feed forward computations, and the bottom portion for back propagation computations. The input vector 300 is presented at fXi along with control signals 810 (represented using dashed lines).

The weighted sum module 310 is illustrated as a Parallel Multiply Accumulator (PMAC). A vector multiplier and an array adder are used. The transfer function module 320 provides the neuron output 235.

Two dual port memories are used as weight memory 315; both are updated simultaneously to synchronize their contents, to overcome the above mentioned data hazard problem.

One dual port memory has port A to read current weights for the forward data flow and port B to write updated weights (following back propagation) in the same clock cycle. Thick lines define parallel buses. The width of all these buses is the same, and coincides with the number of inputs (n), including bias, for the layer.

There is also shown an accumulator unit 880 (optional) which eliminates the one cycle latency between reading a weight and writing its update. This change provides the updated weight in the next cycle before it is updated in the weight array.

The backward data flow in the neuron 215 consists of the weights 860 (bWi), input data 300 (bXi) vector, gradient 865 (bOi). There is also shown the corresponding address (bAi) and a write enable line (bWei) 810 (controls) which differentiates between testing and training passes. All values correspond to the same virtual network of the forward data flow. Note that, in this case, the gradient 865 calculation is external to the neuron 215.

Shift registers 825 are required to align the data correctly as inputs to various pipelined hardware modules. The shift registers 825 are represented with a single Z symbol. The weight change module 325 is implemented as a vector multiplier and the weight update module 330 as an array adder. The second dual port memory of the weight memory 315 recalls the weight to the weight update module 315 via port A and updates the weight change via port B.

B. Pipeline implementation

According to another aspect, the embodiments described herein provide a customized scalable network that is pipelined.

For ease of explanation only some pipelining features will be described in detail.

The first feature is an implementation requirement in performing Equation (7a) (pattern synchronized out of order weight update) or (7b) (the epoch synchronized out of order weight update) and feed forward calculations simultaneously, and the second feature is a design concept related to the natural sequence of updates that occur in a pipelined implementation of MLP-BP networks.

1) Out of Order Weight Update Implementation:

Referring to the above Equations (7a) (pattern synchronized out of order weight update) and 7(b) (epoch synchronized out of order weight update), it is evident that for every synapse, a weight must be read in hardware at every cycle in order to be subsequently updated. The updated weight must then be written back to memory (weight memory 315) at the same time as the next weight is read for the next update cycle. A write-through memory configuration is selected for the weight memory 315 since the weight that is read in one cycle must be equal to the updated weight from the previous cycle. The fact that two operations are performed in one clock cycle on the same weight memory 315 requires the weight memory 315 to have two ports, or rather a dual port memory to be used in a write-through configuration, with one port locked in read and the other in write mode, or any other memory organization that allow these operations to be performed in one clock cycle.

Keeping in mind that both the back propagation and feed forward stages are implemented in parallel, the same set of weights contained in the weight memory 315 must be readily recalled at every clock cycle by feed forward operations as well, thus requiring another memory port to be present.

As three port memories are not typically present in current FPGA architectures as high performance built-in modules, in this case, a two dual-port memory solution may be used (FIG. 15), where both write ports update the memories with the same weight values to keep both memories up to date. The read ports are then dedicated to reading back these values, one port for feed forward calculations, one port for weight recall during update.

2) Hardware Delay:

In a pipeline implementation, an issue can arise with the sequence of weight updates that occur during the back propagation pass. The weights are updated for a given pattern (or input vector) at the output layer 210 first, and then in the hidden layer 205. This is in reverse of the sequence of weight recalls that occur during feed forward operation for another pattern. Thus in the natural pipeline implementation, for example, a pattern $x_3$ traversing the feed forward path may use a weight set in the hidden layer 205 produced by back propagation of an earlier pattern $x_1$, while in the output layer 210 pattern $x_3$ may use a weight set resulting from an update by a later pattern $x_2$. The deviation from the classical temporal properties of the MLP-BP algorithm thus come not only from using a weight set updated by an old, instead of immediately previous, pattern propagation; but also from using different weight sets at each layer as the patterns propagate in different directions than the resulting weight updates.

It can be important to eliminate the effect of temporal offset in the sequence of weight recalls versus the sequence of weight updates across layers to adhere to the temporal properties of the classical MLP-BP algorithm more strictly. The goal here is to recall a set of weights during a pattern's traversal of the feed-forward path which was generated by the completion of weight updates belonging to the same previously presented pattern across all layers.

As a solution, in some embodiments the neuron 215 contains a pipeline buffer tuned to the latency (as explained above) of the forward and backward pipeline stages, as appropriate. This allows a weight update to occur first in the hidden layer 205, then an input pattern is paired up with this weight update, and the update at the output layer 210 occurs when the same input pattern is later processed by that layer.

C. Efficiency Implementation

According to a further aspect, the systems and methods described herein provide a customized scalable network having an efficient implementation, which may involve using a variable arithmetic representation.

The embodiments described herein are intended to consume resources quite efficiently. For example, only the necessary hardware resources (e.g. modules and routing buses) are used to fulfill the requirements of the variable degree of parallelization selected. Further, the arithmetic representation is used to further enhance efficiency of resource consumption for a given network.

Variable arithmetic representation is used to obtain reasonable convergence performance and keep resource consumption low. For some embodiments, it is possible to go further and constrain each result and parameter in the hardware implementation of Equations (1) to (5), (7a) and 7(b) to a particular precision and range. This represents a local variable arithmetic representation, where each individual parameter has a selected arithmetic representation.

However, in other embodiments the chosen arithmetic representation may be a global setting—the same selected arithmetic representation will apply for all parameters.

D. Activation Function

In accordance with embodiments described herein, each neuron 215 of the network layers contains a transfer function module 320. There are a number of techniques for configuring the neuron transfer function module 320. The modularity of the current architecture is intended to allow for seamless interchangeability of the transfer function module.

In some embodiments the transfer function module 320 implements the above Equation (2). It may also be implemented as a five-piece linear log-sigmoid approximation as shown below by Equations (9) and (10).

The approximation scheme consumes few resources and has a short pipeline latency (number of pipeline stages required for high performance operation).

For this approximation scheme, the transfer function module 320 implements an approximation calculation summarized in Equations (9,10) below.

$$f(x) = \begin{cases} 0 & x \leq -8; \\ \dfrac{8 - |x|}{64} & -8 < x \leq -1.6; \\ \dfrac{x}{4} + 0.5 & |x| < 1.6; \\ 1 - \dfrac{8 - |x|}{64} & 1.6 \leq x < 8; \\ 1 & x > 8. \end{cases} \quad (9)$$

$$f'(x) = f(x) \times (1 - f(x)) \quad (10)$$

Results: Scalability and Variable Degree of Parallelism

As an illustrative example, test results of an entire architecture coded in VHDL using an example hardware device Xilinx ISE 8.2 and tested under ModelSim 6.1 are provided. It was also mapped onto an XC2VP100 Amirix AP1000 FPGA development board and a XC2v2000 Multimedia board. The Xilinx hardware device platform is intended as an example only and other platforms may be used, such as for example Altera, or a manufactured ASIC under a variety of processes.

Table I provided below gives a general idea of consumed resources in terms of slices, multipliers and block rams for various network topologies and degrees of parallelism. These are all generated using a 1-4-13 fixed-point representation which is an efficient arithmetic format for implementing an ANN such as an MLP-BP on a hardware devices such as FPGAs.

Figures 16A, 16B:
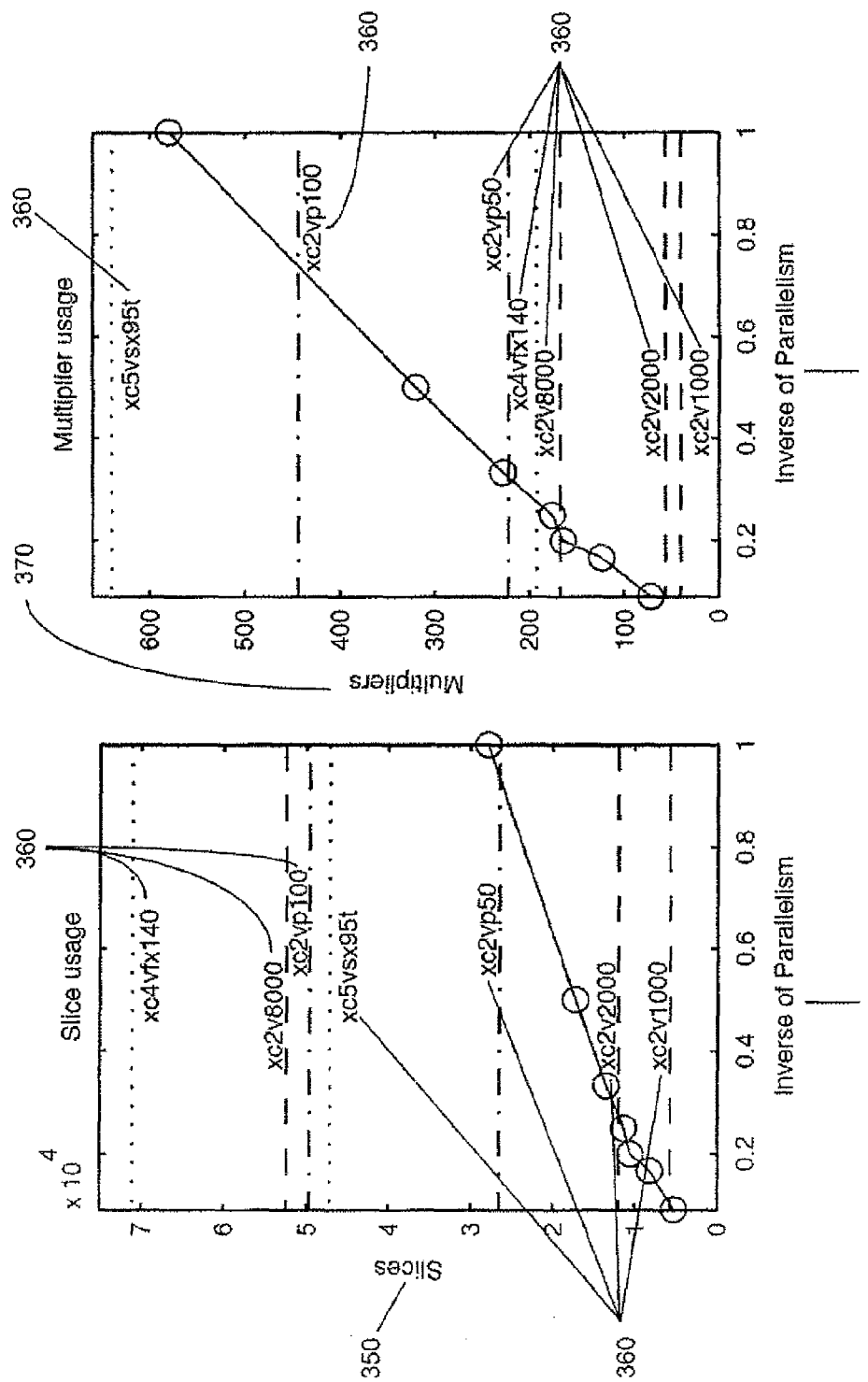
FIGS. 16(a) and 16(b) illustrate examples graphs showing slice usage and multiplier usage, respectively, considering variable degrees of serialization.

Referring now to FIGS. 16(a) and 16(b) there is shown two graphs illustrating the impact of variable degrees of parallelism on resource utilization for an example hardware device and various FPGA chips. A 10-10-10 network topology was synthesized using configurations from fully parallel (ITER=1) to fully serial (ITER=11). It will be understood that the fully serial configuration represents a practical maximum for degree of parallelization.

FIG. 16(a) illustrates a graph relating to slice usage where slice consumption 350 is plotted against the degree of serialization 355 (or inverse of parallelism 1/ITER) along with some current Xilinx FPGA chip offering capacities 360: xc4vfx140, xc2v8000, xc2vp100, xc5vsx95t, xc2vp50, xc2v2000, and xc2v1000.

FIG. 16(b) illustrates a graph relating to multiplier usage where multiplier consumption 370 is plotted against the degree of serialization 375 (or inverse of parallelism 1/ITER) along with some current Xilinx FPGA chip offering capacities 360: xc4vfx140, xc2v8000, xc2vp100, xc5vsx95t, xc2vp50, xc2v2000, and xc2v1000.

The graphs in both FIGS. 16(a) and 16(b) shown that the effect of varying parallelism is fairly linear with respect to resources consumed—doubling the number of cycles per pattern halves the number of slices and multipliers occupied by the network.

TABLE I

SUMMARY OF RESOURCES CONSUMED BY VARIOUS TOPOLOGIES

| Topology | Weights | ITER | Slices | Multipliers | Block Rams |
|---|---|---|---|---|---|
| 2-2-1 | 9 | 1 | 1482 | 26 | 18 |
| | | 2 | 1224 | 18 | 12 |
| | | 3 | 920 | 12 | 6 |
| 5-5-2 | 42 | 1 | 5208 | 108 | 84 |
| | | 2 | 3418 | 59 | 42 |
| | | 6 | 1852 | 25 | 14 |
| 10-5-2 | 67 | 1 | 7092 | 158 | 134 |
| | | 2 | 4648 | 89 | 72 |
| | | 11 | 1905 | 25 | 14 |
| 10-10-2 | 132 | 1 | 13096 | 308 | 264 |
| | | 2 | 8468 | 172 | 144 |
| | | 11 | 2889 | 40 | 25 |
| 10-10-5 | 165 | 1 | 18699 | 410 | 330 |
| | | 2 | 11872 | 228 | 180 |
| | | 11 | 3790 | 52 | 30 |
| 10-10-10 | 265 | 1 | 27908 | 580 | 440 |
| | | 2 | 17306 | 320 | 240 |
| | | 11 | 5247 | 72 | 40 |

The ratio of multipliers to slices is high versus resource ratio typically provided in Xilinx FPGA chip offerings. Much effort was dedicated to reducing auxiliary resource usage, such as block rams and slice consuming hardware. The multipliers could generally not be reduced as their number directly impacts the number of multiply-intensive operations the hardware is capable of performing in parallel. Furthermore, the practical limit on achieving the smallest hardware footprint using variable/tunable connection parallelism is considered the maximum serialization for one neuron. If the hardware can handle a larger degree of virtualization of arithmetic operations (tunable neuron and layer parallelism), serialization can further be increased with a further linear decrease in resource consumption.

Results: Implementation Efficiency

As discussed above, implementation efficiency is explored at two levels: arithmetic representation and resources and performance estimation.

A. Level I: Arithmetic Representation

Fixed-point representation is generally used in the example implementation of the architecture.

Figure 17:
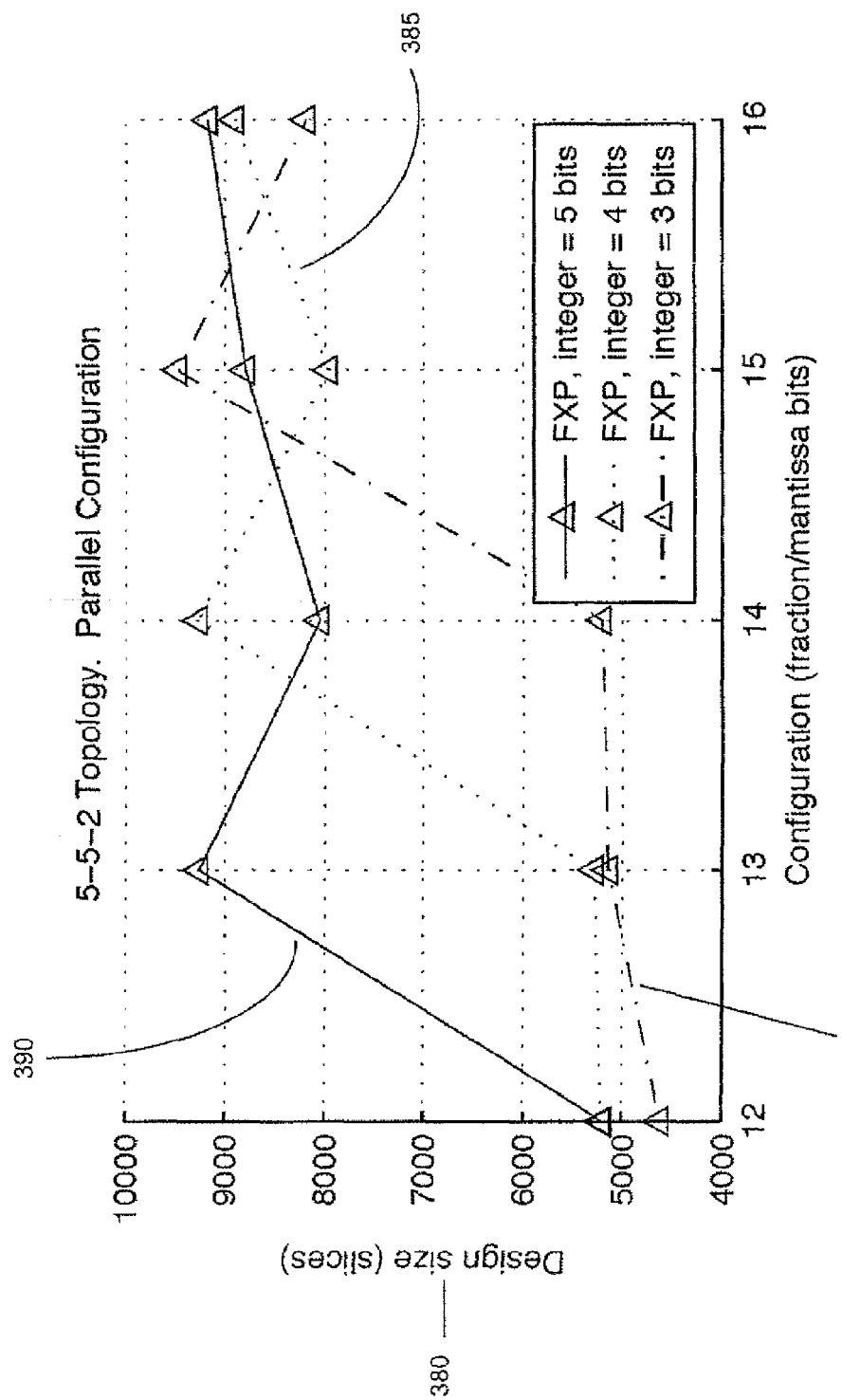
FIG. 17 illustrates an example graph of synthesis results for a fully parallel network having a 5-5-2 topology in terms of slices consumed when using various arithmetic representations.

Referring to FIG. 17 there is shown a graph of synthesis results in terms of slices 380 consumed when using various arithmetic representations in a fully parallel network with 5-5-2 topology. The various arithmetic representations include: fixed point integer with 5 bits 390, fixed point integer with 4 bits 385, and fixed point integer with 3 bits 395.

Figure 18:
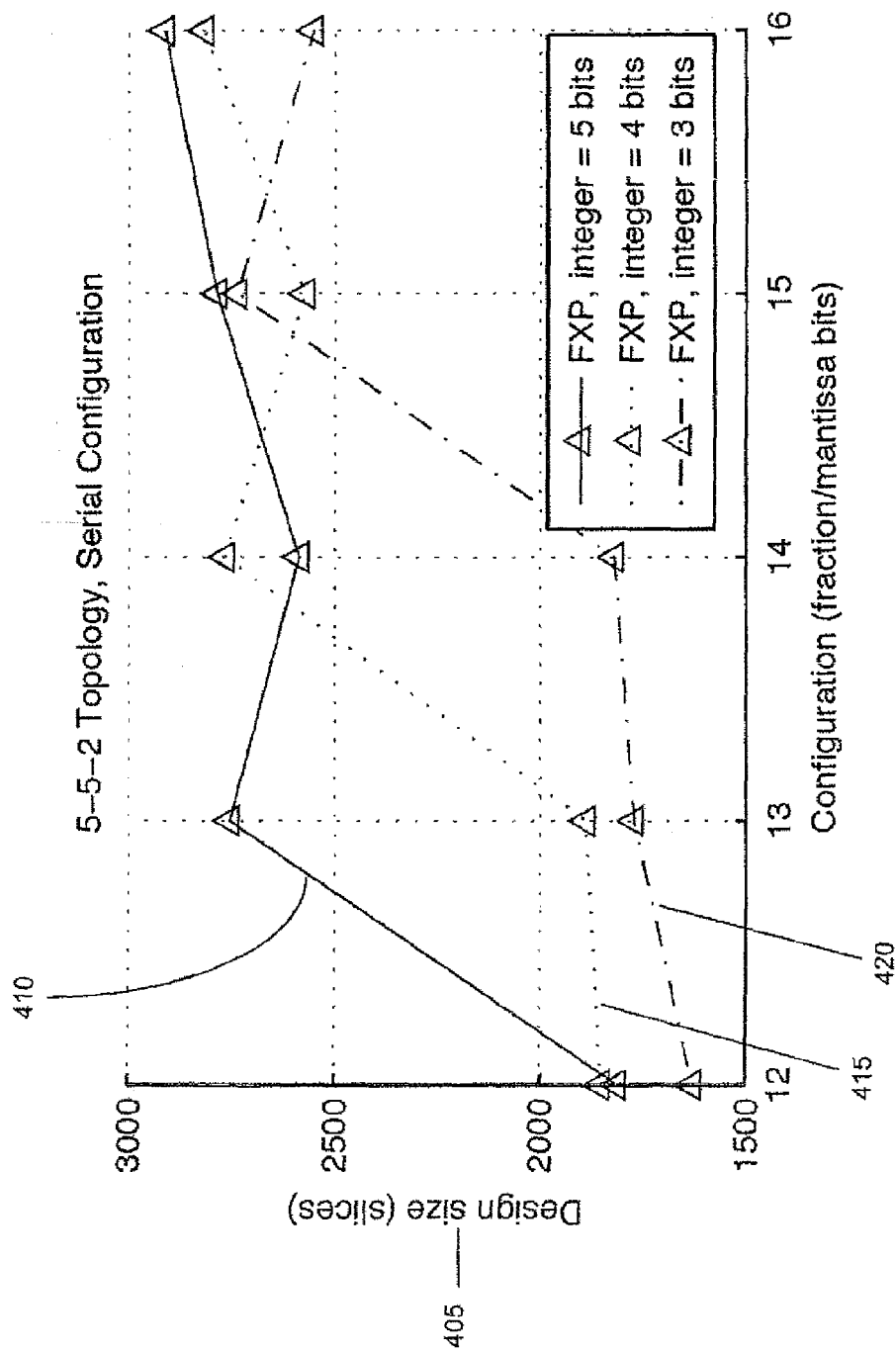
FIG. 18 illustrates an example graph of synthesis results for a fully serial network having a 5-5-2 topology in terms of slices consumed when using various arithmetic representations.

Referring to FIG. 18 there is shown a graph of synthesis results in terms of slices 405 consumed when using various arithmetic representations in a fully serial network with 5-5-2 topology. The various arithmetic representations include: fixed point integer with 5 bits 410, fixed point integer with 4 bits 415, and fixed point integer with 3 bits 420.

In general, slice utilization increases gradually and multiplier usage remains constant until the total number width reaches 18 bits, not including the sign bit, or 19 bits total. At 19 bits, slice utilization jumps as the synthesizer uses the 18 bit built-in multiplier resources for the 18 significant bits of the number, and adds hardware using general FPGA fabric to manage the extra bit of 2's complement representation.

When the number width surpasses 19 bits, slice usage drops one step and gradually begins to increase again, and multiplier count quadruples. This is true for both the serial and fully parallel configurations.

In addition to the impact of arithmetic representation on resources used, arithmetic representation also has a direct impact on ANN convergence to a suitable solution to the modeled problem. ANN applications can be generally classified as either classification or function approximation problems. Classification problems require less precision in its output than functions approximation since what is needed is for the network to pick one class among many. An arithmetic representation that is very limited in precision could be suitable for a classification problem but not for a function approximation problem. The nature of the problem can also impact the arithmetic format used. Problems with complex weight space generally require higher precision than problems with more simple weight space. None of these issues can be determined before training starts. As such it is critical that the implementation be able to change the arithmetic representation when it is clear than one representation is hindering the ANN from achieving a suitable solution level.

One fixed point representation that has repeatedly shown good results in the past is one of 18 bits total width with a balance between integer and fractional resolution. We use a 1-4-13 representation throughout, with a ±16 range and $2^{-13} \approx 1 \times 10^{-4}$ resolution.

B. Level 2: Resource and Performance Estimation

Figure 19:
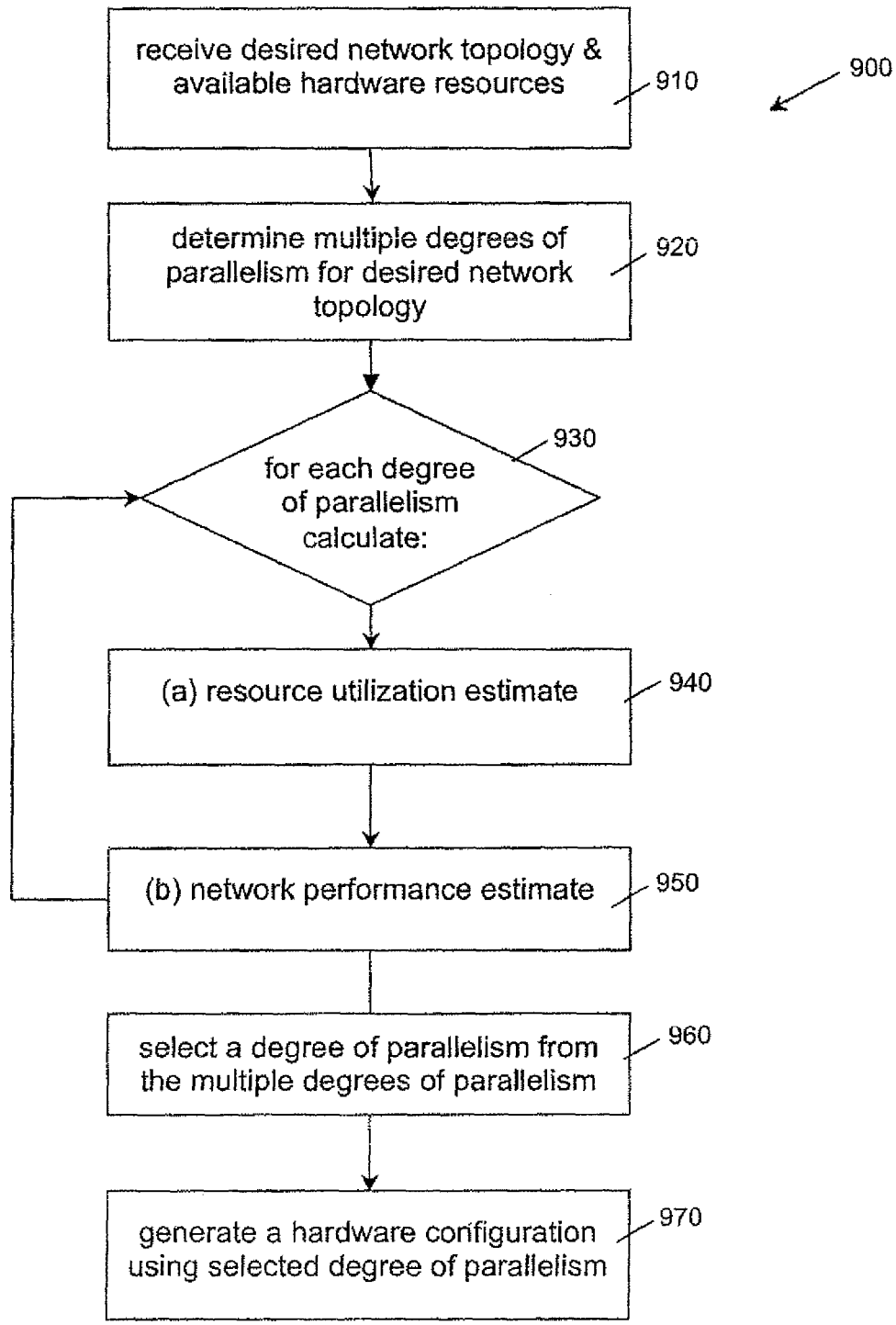
FIG. 19 illustrates a flowchart diagram of a method for designing a hardware configuration for implementing a scalable artificial neural network in accordance with embodiments described herein.

Referring now to FIG. 19 there is shown a flowchart diagram of an example method 900 for designing a hardware configuration for implementing a scalable artificial neural network in accordance with embodiments described herein. Certain steps of the method 900 may be implemented by a system for designing a hardware configuration for implementing a scalable artificial neural network, such as the example system 1000 illustrated in FIG. 20.

At step 910 a desired network topology and information relating to hardware resources available for one or more hardware devices 1005 is provided to the system 1000 and received by input module 1010. The desired network topology provides the number of inputs, neurons in the hidden layer(s), and neurons in the outer layer. The hardware resources available may be provided as, for example, a clock frequency or frequencies, a number of multipliers, slices, or block RAMs, an area of silicon, or other measures of hardware resources. In some cases, the hardware resources available may comprise a table of information such as that above relating to particular hardware devices (processors, chips, etc.). In providing the information relating to hardware resources available, a subset of the table may be selected based on, for example, hardware cost, power requirements or the like to set a limit to the provided hardware resources available. In other cases, the hardware resources available may relate to a subset of resources on a particular hardware device.

At step 920, a set of multiple degrees of parallelism that may be used for implementing the desired network topology is determined in order to calculate each degree's corresponding resource and performance estimates. Any number of ITER values may be chosen to make up the set of the multiple degrees of parallelism, and each ITER value of the set may be any small or large number.

Practically speaking, the ITER values used range from 1 to the number of INPUTs+1. As will be understood to one of skill in the art, the +1 additional unit reflects a "bias" in the input, which is internal to the network and is commonly used in ANN designs.

However, some of the ITER values used in the set may also be greater than the number of INPUTs+1. This may degrade performance, as more cycles are required to process each pattern. There will be empty or useless clock cycles. This does not generally decrease resource utilization since hardware for at least one number per clock cycle must be present at a minimum.

For each degree of parallelism of the multiple degrees of parallelism at least one of two estimates are calculated (step 930).

Specifically, at step 940 a resource estimation module 1020 calculates a hardware resource estimate representing a measure of the hardware resources required to implement the desired network topology. This estimate is calculated for each of the multiple degrees of parallelism. The resource estimation may be calculated by, for example, determining the number of network weights using the desired network topology. Then for each degree of parallelism in the set, calculate a measure of the hardware resources required (i.e. a resource estimate) to implement the determined number of network weights. In some embodiments, the hardware resource estimate for each ITER value is calculated by the resource estimation module 1020 using Equations (11) and (12) provided herein.

At step 950, a performance estimation module 1015 calculates a performance estimate for the desired network topology with the given degree of parallelism. This estimate is calculated for each of the multiple degrees of parallelism. In a particular case, the network performance estimate represents a measure of the number of network parameters or weights updated each second when implementing the desired network topology.

In order to determine a performance estimate, a number of networks weights based on the network topology may be determined. A measure of the hardware processing speed available may also be available as an element of the hardware resources available. This processing speed may be referred to as the clock frequency, and may be obtained from hardware specifications. Then a number of updates that can be performed on the number of weights in a predetermined time based on the processing speed is determined based on the given degree of parallelism. This number of updates represents the performance estimate for each given degree of parallelism in the set.

In some embodiments, the network performance estimate for each ITER value is calculated by the performance estimation module 1015 using Equations (13) and (14) provided herein.

At step 960, an ITER selection module 1025 selects a degree of parallelism (ITER value 1035) from the multiple degrees of parallelism of the set. The ITER selection module 1025 receives the hardware resources available from the input module 1010.

The ITER selection module 1025 processes the hardware resource estimates and the performance estimates for each degree of parallelism as well as the amount of available hardware resources, and generally selects the degree of parallelism that provides the a required level of network performance and uses less than or all of the available resources. When selecting the degree of parallelism the ITER selection module 1025 may also consider an application performance requirement, and select a degree a parallelism corresponding to a resource performance estimate that at least satisfies the application performance requirement, and, in particular cases that uses less than or all of the available resources.

In addition, the ITER selection module 1025 may also select the degree of parallelism by considering all resource estimates, and selecting the degree of parallelism corresponding to the resource estimate that is closest to, but less than or equal to, the amount of available resources, with or without considering the performance estimates.

In some embodiments, the ITER value 1035 is directly output by the system 1000 for use in designing the scalable network implementation.

The ITER value 1035 selected by the ITER selection module 1025 may also be provided to a hardware configuration module 1030.

At step 970, the hardware configuration module 1030 generates a hardware configuration 1040 based on the selected ITER value 1035 as described in relation to step 640 of FIG. 8. Of course, this hardware configuration may also be output as noted herein to allow use of the hardware configuration in making hardware devices.

1) Resource Estimation:

Referring back to step 940, hardware resource estimate calculations for certain embodiments will be described in further detail. For FPGAs, hardware resources may be estimated by determining required amounts of various hardware device resources, such as slices, multipliers, and memory blocks (e.g. block ram).

Generally, it may be difficult to estimate the required number of slices consumed by every implementation, and it is unnecessary due to the low slice to multiplier consumption ratio. That is, the limiting factor in synthesizing the hardware configuration is the number of multipliers consumed. Even when all multipliers are consumed, there will be a portion of slices still available due to high slice/multiplier ratios in current FPGA offerings.

The number of multipliers used can be estimated by using the following equation (11) which links the desired network topology and ITER value with the number of multipliers needed to implement the network.

$$MULT = N_h\left(2\left\lceil\frac{N_i+1}{ITER}\right\rceil+1\right)+ \\ N_o\left(2\left\lceil\frac{N_h+1}{ITER}\right\rceil+1\right)+\left\lceil\frac{N_o}{ITER}\right\rceil+(N_o+1)\left\lceil\frac{N_h}{ITER}\right\rceil \quad (11)$$

Where:
$N_i$—number of inputs
$N_h$—number of hidden neurons
$N_o$—number of output neurons
ITER—clock cycles (iterations) per input pattern As an example of memory blocks, an estimate for the number of block rams is provided. This number will generally be less than the number of multipliers used.

$$\text{Block Rams} = 2N_h\left\lceil\frac{N_i+1}{ITER}\right\rceil+2N_o\left\lceil\frac{N_h+1}{ITER}\right\rceil \quad (12)$$

For ASIC designs, hardware resources may be estimated by the consumed silicon area, where the consumed silicon area is generally determined as follows:

Silicon area=$f_n$(# of multiplier, Memory, Equivalent gates)

Similar resource estimation can also be established on other systems, including, for example, multi-core and heterogeneous systems such as the IBM IBM's cell broadband engine architecture.

2) Performance Estimation:

As explained above, at step 950, network performance estimates are calculated. Network performance is generally estimated as a function of network topology, clock speed and the ITER value. However, additional hardware specifications can also be considered such as, for example, power consumption.

In some embodiments, network performance is measured by Connection Update Per Second (CUPS) which is the number of network parameters or weights updated each second. To calculate CUPS, first the number of weights in the network is calculated by the following equation (13):

$$\text{Weights}=(N_i+1)N_h+(N_h+1)N_o \quad (13)$$

Where:
$N_i$—number of inputs
$N_h$—number of hidden neurons
$N_o$—number of output neurons Since a network can update its weights once each ITER number of cycles, the network performance measurement in CUPS can be calculated by the following equation (14):

$$CUPS = \frac{\text{Weights}\times f}{ITER} \quad (14)$$

Where f is the expected operational clock frequency.

As such, network performance in terms of CUPS may be estimated using the network topology (which is used to calculate the number of weights), the ITER value, and clock frequency (rate). The clock frequency is generally provided by the hardware device specifications.

3) Multiplier to Weight Ratio

By estimating the number of network weights and multiplier usage, the number of multipliers used per weight (i.e. the ratio of multipliers to weight ratio) may also be estimated. The ratio of multipliers used per weight acts as a constraint on the network topology and resource utilization when selecting the ITER value, as the number of weights that can be implemented on the hardware device is limited by the number of the multipliers available for use. As such, the ratio of multipliers to weights acts to link hardware device resource utilization with network performance.

The ratio is generally calculated by dividing the number of multipliers (from Equation (11)) by the number of weights (from Equation (13)), for a given topology and ITER value.

In some embodiments, an upper limit of the ratio and lower limit of the ratio are calculated in order to determine a general range of multipliers to weight ratios for multiple network topologies. An upper limit of the ratio may be determined using an example topology with a large number of outputs per neuron. A lower limit of the ratio may be determined using an example topology with a large number of inputs per neuron.

An efficient implementation generally has a low multiplier per weight ratio as will be illustrated using the formulas below. The provided examples are limiting cases, in order to show a bound on resource efficiency.

A highly efficient pipelined implementation uses 2 multipliers per weight. As shown in the illustrative examples.

As an example, the upper limit of the ratio of multipliers to weights may be determined using a network having a 1-1-$N_0$ topology, as illustrated by Equation (15). This is representative of a network topology with only a few inputs and hidden neurons, and a wide output layer (with $N_o$ ranging to large numbers). Note that such a topology is not common in practice.

$$Ratio_\uparrow = Ratio_{1-1-N_o} = \lim_{N_o \to \infty} \frac{7(N_o + 6)}{2N_o + 2} = 3.5 \qquad (15)$$

The lower limit is reached when the situation reverses, with each neuron having a high number of inputs, and the number of neurons kept minimal. As an example, the lower limit of the ratio of multipliers to weights may be determined using a network having $N_i$-1-1 topology, as illustrated by Equation (16). A $N_i$-$N_h$-1 network topology is another example.

$$Ratio_\downarrow = Ratio_{N_i-1-1} = \lim_{N_i \to \infty} \frac{2(N_i + 1) + 9}{N_i + 3} = 2 \qquad (16)$$

Using these examples, the ratio of multipliers to weights ranges between 2 (lower limit) and 3.5 (upper limit). That is, generally 2 to 3.5 multipliers are used to implement a weight that is updated every ITER number of cycles. As a rough estimate generally 3 multipliers are required to implement a weight. These estimates constrain the topology to be implemented on a particular hardware device as the number of weights that may be used is limited by the number of multipliers available for use.

These latter more efficient topologies are representative of typical classification and function approximation problem solutions, where the number of inputs to the network is large and the number of outputs required is relatively small.

A list of other limiting cases, together with values from Equations (15) and (16) are presented in Table II below where the number of nodes or neurons ($N_{(i,h,o)}$) in a given layer is large relative to layers with a small number of nodes (represented by a single node in the limiting case).

The topology size of the network that can be implemented on a given hardware device is limited by the number of multipliers available on the given hardware device (e.g. FPGA) for use in the example MLP-BP implementation. As such, given available hardware device resources a potential maximum performance of a network can be roughly estimated using the above given values. In general, a more parallel network with many inputs to neurons will generate better performance in CUPS than a more serial network with many neurons but few inputs.

TABLE II

MULTIPLIER TO WEIGHT RATIOS FOR VARIOUS TOPOLOGIES

| Network Topology | Ratio | Network Topology | Ratio |
|---|---|---|---|
| 1-1-1 | 3.25 | $N_i$-$N_h$-1 | 2 |
| $N_i$-1-1 | 2 | $N_i$-1-$N_o$ | 3 |
| 1-$N_h$-1 | 3 | 1-$N_h$-$N_o$ | 3 |
| 1-1-$N_o$ | 3.5 | $N_i$-$N_h$-$N_o$ | 2.5 |

Results: Performance

Performance in Terms of CUPS

Using Equations (11), (13) and (14) as a guide, it is now possible to derive boundaries on maximum performance of a network fully utilizing available resources of an example hardware device, in this case FPGAs. In these examples an entire FPGA is available for use, however this is not necessary for all embodiments. To get an idea of maximum performance obtainable by current FPGA offerings, a selection of Xilinx FPGA devices is taken and information about the number of multipliers (MULT) and maximum frequency of operation (or clock rate) is given in Table III. Device performance is expressed in terms of CUPS.

TABLE III

MAXIMUM ATTAINABLE PERFORMANCE BY SPECIFIC FPGAS

| Family | Device | Slices | MULT | Freq. | Perf. |
|---|---|---|---|---|---|
| Virtex 2 | xc2v1000 | 5760 | 40 | 200 MHz | 4 G |
|  | xc2v2000 | 12096 | 56 |  | 5.6 G |
|  | xc2v8000 | 52441 | 168 |  | 16.8 G |
| Virtex 2P | xc2vp50 | 26568 | 232 | 250 MHz | 29 G |
|  | xc2vp100 | 49608 | 444 |  | 55.5 G |
| Virtex 4 | xc4vLX200 | 100224 | 96 | 500 MHz | 24 G |
|  | xc2vSX55 | 27648 | 512 |  | 128 G |
|  | xc4vFX140 | 71064 | 192 |  | 48 G |
| Virtex 5 | xc5vLX330 | 51840 | 192 | 550 MHz | 52.8 G |
|  | xc5vSX35T | 5440 | 192 |  | 52.8 G |
|  | xc5vSX95T | 14720 | 640 |  | 176 G |

Using a minimum ratio of 2 multipliers to each weight (as illustrated above), the largest theoretical performance for this example MLP-BP implementation can be obtained on a Virtex 5 SX series FPGA from Xilinx. The FPGA contains 640 multipliers, can operate at 550 MHz, and thus can achieve a maximum of 176G CUPS.

Coincidentally, the lowest theoretical performance on the same FPGA for a network taking up the entire chip is 100G CUPS, with the actual performance depending on the desired network topology being implemented.

Table IV below shows the actual frequencies of operation determined by Xilinx ISE synthesizer, Post Place and Route and Static Timing respectively. Some embodiments achieve about 75% of clock rates listed in Table III for both Virtex II and Virtex II Pro.

TABLE IV

ACTUAL OPERATING FREQUENCY ON DIFFERENT FPGAS

| FPGA | Post Synthesis | Post PAR | Static Timing |
|---|---|---|---|
| Virtex II | 156 MHz | 144 MHz | 144 MHz |
| Virtex II Pro | 152 MHz | 140 MHz | 140 MHz |
| Virtex 4 | 317 MHz | 227 MHz | 227 MHz |
| Virtex 5 | 397 MHz | 361 MHz | 361 MHz |

Comparison with Commercial and Research ANN Hardware Accelerators

Using CUPS as a measurement term, these results may be compared to some recent commercial and research efforts to build hardware accelerators for ANN computation and particularly MLP-BP. Table V includes several commercial boards who are all implemented using ASIC and one recent FPGA implementation from the research community as described in J.B.R. Gadea, R. Palero and A. Cortes, "Fpga implementation of a pipelined on-line backpropagation,"

Journal of VLSI Signal Processing, vol. 40, pp. 189-213, September 2005 ("Gadea"). The FPGA implementation only has synapse and layer parallelism but not node parallelism.

These results and comparison are generally based only on some current devices and configurations. It will be understood that improved results are expected as faster devices and devices having more available resources are manufactured. Further, it is anticipated that various ASIC implementations may provide further enhanced results, due to the differences in performance between ASIC implementations and FPGA implementations There are a large number of problems or applications in the literature for testing MLP-BP and neural networks in general. Using ANNs to solve these applications generally requires a reasonable degree of network convergence or at least a minimum level of network performance. This may also be referred to as an application performance requirement.

Four example problems were selected that generally represent a mix between research-oriented problems and practical ones, and also a mix between classification type problems and function approximation problems. Following is a description of each problem.

TABLE V

COMPARISON BETWEEN CURRENT ANN HARDWARE ACCELERATORS AND PROPOSED ARCHITECTURE

| Name | Architecture | Learning | Precision | Neurons | Synapses | Speed | |
|---|---|---|---|---|---|---|---|
| SIMD | | | | | | | |
| Inova N64000 | GP, SIMD, Int | Program | 1-16 bits | 64 PE | 256K | 220 | MCUPS |
| Hitachi WSI | Wafer, SIMD | BP | 9 × 8 bits | 144 | N.A. | 300 | MCUPS |
| Neuricam NC3001 TOTEM | Feedforwad, ML, SIMD | No | 32 bits | 1-32 | 32K | 1 | GCPS |
| Neuricam NC3003 TOTEM | Feedforwad, ML, SIMD | No | 32 bits | 1-32 | 64K | 750 | MCPS |
| RC Module NM6403 Systolic Array | Feedforwad, ML | Program | 1-64 × 1-64 | 1-64 | 1-64 | 1200 | MCPS |
| Siemens MA-16 Research data | Matrix ops | No | 16-bits | 16 PE | 16 × 16 | 400 | MCPS |
| Gadea | Feedforwad, ML | BP | Variable | Topology dependent | | up to 5 | GCUPS |
| Proposed Architecture | Feedforward, ML | BP | Variable | Variable | Degree of Parallelization dependent | up to 175 | GCUPS |

Testing on Benchmark Problems

Some of the example embodiments described herein were tested using hardware simulations in terms of convergence on a set of standard benchmark problems for testing MLP-BP ANNs, namely: PARITY, IRIS, CANCER, and SIN. The results were compared with similar software simulations conducted using MATLAB and WEKA software.

To test these example embodiments hardware simulations using ModelSim 6.1 were conducted. Performance was obtained using the number of clock cycles in a training run and a conservative clock frequency estimate of 100 MHz. Each network is trained for a number of epochs and is then tested with the entire data set once. Using a VHDL benchmark module, a root mean square calculation is performed, and results are written to file at desirable epoch resolution.

For all hardware simulations, error data points are obtained by testing the average error for the entire data set for every 10 epochs trained. A 1-4-13 fixed point arithmetic representation and ITER=1 was used. The value of ITER is irrelevant in epoch and pattern based convergence comparisons, since the numerical state of the network after processing each pattern is exactly the same no matter the degree of parallelism.

For comparison, similar software simulations using Matlab and Weka were also conducted. Simulations were carried out on a computer with an AMD 1.3 GHz processor and 1 Gb of RAM. The Matlab R2006a Neural Network Toolbox was used for simulating various networks and conducting convergence tests. In addition, a machine learning simulation environment (WEKA) was also used to verify software performance. It should be noted that software implementations used IEEE double precision representation and direct calculation of the sigmoid transfer function of Equation 2 was carried out in software.

PARITY problem: The PARITY problem is a classification problem aimed at determining a parity output for a three bit input. The topology used for simulations is 3-10-1 (3 inputs, 10 hidden neurons and 1 output neuron).

IRIS problem: The IRIS problem represents a classical classification problem. This relates to the classification of three iris plant varieties using lengths and widths of petals and sepals taken from 150 samples of the flower. Fifty samples/patterns belong to each of the classes. A 4-2-3 network topology is used for simulations.

CANCER problem: The CANCER problem is a classification problem that contains 699 patterns with 9 inputs each, and 2 output classes. A 9-10-2 network topology is used for simulations.

SIN problem: This is a function approximation problem. One period of the sine wave is generated by using 13 equidistant points in [0, 2π) range. A 1-4-1 network topology is used for simulations.

Table VII below summarizes the results after training the four problems using the hardware simulations of the embodiments described herein, Matlab, and Weka. A conservative clock rate of 100 MHz is chosen for the hardware operation. The hardware time is calculated using the following equation assuming that one pattern is processed every clock cycle.

Time=Number of patterns per epoch

*number of epochs*clock rate  (17)

As Table VII presents, the hardware simulations of the embodiments described herein consistently achieves three to five orders of magnitude speed up (1000×-100000×) over both Matlab and Weka.

Table VI presents the results in terms of CUPS. Please note that the current computers may be up to 2-3× times faster than the computer used for these experiments. Further, it is anticipated that an optimized mapping of the FPGA pipeline may achieve 2-3× times higher clock rates than 100 MHz as well.

TABLE VI

SUMMARY OF RESOURCE RATIO AND RAW PERFORMANCE

| Problem | Topology | Weights | Multi-pliers | Ratio | Performance (CUPS) 100 MHz | Performance (CUPS) 550 MHz |
|---|---|---|---|---|---|---|
| PARITY | 3-10-1 | 51 | 134 | 2.62 | 5.1 G | 28 G |
| IRIS | 4-2-3 | 19 | 54 | 2.84 | 1.9 G | 10.5 G |
| CANCER | 9-10-2 | 122 | 288 | 2.36 | 12.2 G | 67.1 G |
| SIN | 1-4-1 | 13 | 40 | 3.07 | 1.3 G | 7.2 G |

TABLE VII

SUMMARY OF RESULTS ON FOUR PROBLEMS FOR SOFTWARE AND HARDWARE IMPLEMENTATIONS

| Problem | # of Patterns | Topology | HW Time | HW Epochs | HW Epoch size | Matlab Time | Matlab Epochs | Matlab Epoch size | Weka Time | Weka Epochs | Weka Epoch size | HW speedup vs. Matlab | HW speedup vs. WEKA | Effort adjusted HW vs. SW |
|---|---|---|---|---|---|---|---|---|---|---|---|---|---|---|
| PARITY | 8 | 3-10-1 | 160 µs | 2000 | 8 | 12 s | 1500 | 8 | 0.29 s | 2000 | 8 | 7.5e4 | 1.8e3 | 7.5e4 |
| IRIS | 150 | 4-2-3 | 100 µs | 1500 | 10 | 8.8 s | 4000 | 150 | 1.3 s | 4000 | 10 | 8.8e4 | 1.3e4 | 1.4e4 |
| CANCER | 699 | 9-10-2 | 30 µs | 100 | variable | 30 s | 1000 | 699 | 23 s | 1000 | 699 | 1e6 | 7.6e5 | 3.2e3 |
| SIN | 13 | 1-4-1 | 130 µs | 1000 | 13 | 10 s | 1000-2000 | 13 | 70 ms | 1000 | 13 | 7.7e4 | 5.4e2 | 7.7e4 |

What has been described is merely illustrative of the application of the principles of the embodiments. Other arrangements and methods can be implemented by those skilled in the art without departing from the spirit and scope of the embodiments described herein.

As a non-limiting example of a further arrangement, there may be provided a system for designing a hardware configuration of an artificial neural network. The system may include: an input module for receiving information relating to hardware resources available for at least one hardware device and a desired network topology; a parallelism selection module for: determining a plurality of degrees of parallelism for the desired network topology; for each degree of parallelism of the plurality of degrees of parallelism, estimating at least one of: i) a hardware resource estimate to implement the network topology with the degree of parallelism; and ii) a performance estimate for the network topology with the degree of parallelism; and selecting a degree of parallelism based on at least one of the hardware resources available, the hardware resource estimates and the performance estimates; and may include a hardware configuration module for generating a hardware configuration based on the degree of parallelism. One or both of the selected degree of parallelization and the hardware configuration may be output from an appropriate output port/module for use in designing a particular hardware implementation.

We claim:

1. A method for designing a hardware configuration of an artificial neural network, the method comprising:
   receiving information relating to hardware resources available for at least one hardware device;
   receiving a desired network topology;
   determining a plurality of degrees of parallelism for the desired network topology;
   for each degree of parallelism of the plurality of degrees of parallelism estimating at least one of:
      a hardware resource estimate to implement the network topology with the degree of parallelism; and
      a performance estimate for the network topology with the degree of parallelism;
   selecting a degree of parallelism based on the hardware resources available and at least one of the hardware resource estimates and the performance estimates; and
   generating a hardware configuration based on the degree of parallelism simultaneously across a plurality of levels of hardware parallelism.

2. A method according to claim 1, wherein estimating the hardware resource estimate comprises:
   determining a number of weights based on the network topology;
   determining a measure of the hardware resources required to provide the determined number of weights based on the degree of parallelism; and
   assigning the determined measure of the hardware resources required as the hardware resource estimate.

3. A method according to claim 1, wherein the estimating a performance estimate comprises:
   determining a number of weights based on the network topology;
   determining a measure of the hardware processing speed available;
   determining a number of updates that can be performed on the number of weights in a predetermined time based on the processing speed and the degree of parallelism; and
   assigning the determined number of updates as the performance estimate.

4. A method according to claim 1, wherein the selecting a degree of parallelism based on the hardware resources available and at least one of the hardware resource estimates and the performance estimates comprises:
   determining the maximum hardware resources available from among the hardware resources available;
   determining a hardware resource estimate from among the hardware resource estimates that is closest to but less than or equal to the maximum hardware resources available; and
   determining the degree of parallelism associated with the determined hardware estimate.

5. A method according to claim 4, wherein determining a hardware resource estimate from among the hardware resource estimates that is closest to but less than or equal to the maximum hardware resources available further comprises determining the hardware resource estimate from among the hardware resource estimates that maximizes performance.

6. A method according to claim 1, wherein the method further comprises receiving information related to an application performance requirement and wherein the selecting a degree of parallelism based on the hardware resources available and at least one of the hardware resource estimates and the performance estimates comprises:
  determining a performance estimate from among the performance estimates that is equal to or greater than the application performance requirement; and
  determining the degree of parallelism associated with the determined performance estimate.

7. A computer readable non-transitory storage medium, the storage medium comprising instructions to execute the method of claim 1.

8. A method for designing a hardware configuration of an artificial neural network, the method comprising:
  receiving information relating to hardware resources available for at least one hardware device;
  receiving a desired network topology;
  determining a plurality of degrees of parallelism for the desired network topology;
  for each degree of parallelism of the plurality of degrees of parallelism estimating at least one of:
    a hardware resource estimate to implement the network topology with the degree of parallelism; and
    a performance estimate for the network topology with the degree of parallelism;
  selecting a degree of parallelism based on the hardware resources available and at least one of the hardware resource estimates and the performance estimates; and
  generating a hardware configuration based on the degree of parallelism; and
  receiving an arithmetic representation and wherein the estimating at least one of a hardware resource estimate and a performance estimate is based on the received arithmetic representation.

9. A method according to claim 1, wherein the generating a hardware configuration based on the degree of parallelism comprises generating a hardware configuration comprising:
  an input layer;
  at least one hidden layer;
  an output layer;
  a back-propagation subsystem configured to send error data back through the network to adjust weights associated with the output layer and the at least one hidden layer;
  and
  a parallelization system configured to provide the determined degree of parallelization to each of the input layer, at least one hidden layer, output layer and back-propagation system.

10. A method according to claim 9, further comprising configuring a hardware device based on the hardware configuration.

* * * * *